US007580444B2

(12) United States Patent
Brown et al.

(10) Patent No.: US 7,580,444 B2
(45) Date of Patent: Aug. 25, 2009

(54) FREQUENCY HOPPING COMMUNICATION SYSTEM

(75) Inventors: Colin Brown, Ottawa (CA); Philip Vigneron, Kanata (CA)

(73) Assignee: Her Majesty the Queen in right of Canada, as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 421 days.

(21) Appl. No.: 11/355,949

(22) Filed: Feb. 17, 2006

(65) Prior Publication Data
US 2006/0140251 A1    Jun. 29, 2006

Related U.S. Application Data

(63) Continuation-in-part of application No. 11/119,780, filed on May 3, 2005.

(60) Provisional application No. 60/653,989, filed on Feb. 18, 2005, provisional application No. 60/567,652, filed on May 4, 2004.

(51) Int. Cl.
*H04B 1/00* (2006.01)

(52) U.S. Cl. .................. 375/132; 375/131; 375/135; 375/146; 375/147; 370/342; 370/344; 342/150; 342/151; 342/152; 342/153; 342/155; 333/193; 333/194; 333/195; 333/196

(58) Field of Classification Search ........... 375/132, 375/131, 136, 146, 147, 135; 370/342, 344; 342/150, 151, 152, 153, 154, 155; 333/193, 333/194, 195, 196
See application file for complete search history.

(56) References Cited

U.S. PATENT DOCUMENTS

| | | | | |
|---|---|---|---|---|
| 6,118,805 A | * | 9/2000 | Bergstrom et al. | .......... 375/132 |
| 6,128,328 A | * | 10/2000 | Schilling | ................... 375/134 |
| 6,215,810 B1 | | 4/2001 | Park | |
| 6,289,038 B1 | | 9/2001 | Park | |
| 6,859,486 B1 | * | 2/2005 | Mohebbi | ................... 375/132 |
| 6,954,465 B2 | | 10/2005 | Chang et al. | |

OTHER PUBLICATIONS

Spread Spectrum Communications, vol. II, by M.K. Simon et al, Computer Science Press (1985).
E. Lance and G.K. Kaleh, "A Diversity Scheme for a Phase-Coherent Frequency-Hopping Spread-Spectrum System", IEEE Trans. Commun., vol. 45, No. 9, pp. 1123-1129.
Table 8.2-1, p. 492 of text book "Digital Communications, $4^{th}$ Ed," by John G. Proakis, McGraw-Hill, 2001, New York.

* cited by examiner

*Primary Examiner*—Shuwang Liu
*Assistant Examiner*—Helene Tayong
(74) *Attorney, Agent, or Firm*—Teitelbaum & MacLean; Neil Teitelbaum; Doug MacLean

(57) ABSTRACT

The invention provides an adaptive frequency hopping spread-spectrum (FHSS) transmission system and method, which efficiently utilizes available transmission bandwidth, whilst providing robustness to jamming techniques in wireless communication systems. The proposed technique operates by transmitting a wide-band signal over multiple, single-carrier, parallel transmission subbands, which may occupy non-contiguous frequency regions. The proposed scheme exhibits significant gain in error rate performance, as compared to a data rate equivalent single-subband system in the presence of signal jamming and/or interference without a reduction in the transmission data rate nor an increase in transmitter power. In addition, the proposed system and method are adaptive and enable more efficient use of the available bandwidth for communicating, thus increasing the overall bandwidth utilization of the system.

27 Claims, 13 Drawing Sheets

FREQUENCY HOPPING COMMUNICATION SYSTEM

CROSS-REFERENCE TO RELATED APPLICATIONS

The present invention claims priority from U.S. Provisional Patent Application No. 60/653,989 filed Feb. 18, 2005 entitled "A method to measure, ..." and is a continuation in part of U.S. patent application Ser. No. 11/119,780 filed May 3, 2005, entitled "Adaptive Frequency Hopping ...", which claims priority from U.S. patent application No. 60/567,652 filed May 4, 2004, which are incorporated herein by reference for all purposes.

TECHNICAL FIELD

The present invention relates in general to the field of radio communications and, in particular, to adaptive frequency hopping systems and methods for broadband radio communications.

BACKGROUND OF THE INVENTION

Frequency hopping of a transmitted radio signal is used in a variety of spread-spectrum systems of wireless communications as it offers several advantages in both military and civilian applications. In a frequency hopping system, a coherent local oscillator is made to jump from one frequency to another, which limits performance degradation due to interference effects in a communications system, makes message interception more difficult, and lessens detrimental effects of channel collisions in multi-user systems. A description of this and other types of spread spectrum communications systems may be found, for example, in Spread Spectrum Systems, 2nd Ed., by Robert C. Dixon, John Wiley & Sons (1984) and Spread Spectrum Communications, Vol. II, by M. K. Simon et al., Computer Science Press (1985).

For military applications, frequency hopping is particularly important as the interference can take the form of signal jamming in addition to multi-path interference or multi-user interference typically present in civilian applications. The latter two forms of interference are commonly mitigated by including some form of channel equalization in the receiver, encoding and frequency domain multiplexing at the transmitter, or by adequately controlling the number of users in a given transmission area. In terms of signal jamming, however, conventional systems mitigate the effects of jamming by using either a combination of error correction coding, interleaving, and frequency hopping techniques including adaptive hopping sequences, or have to resort to scaling back the expected data rates in response to certain jamming waveforms. For example, to combat the effects of adaptive jamming waveforms, such as follower jammers which attempt to detect and adaptively follow frequency hopping of the communication system, the transmission scheme relies on the transmitter frequency hopping rate being greater than the tracking rate of the jammer.

Irrespective of the frequency hopping rate selected, conventional frequency-hopping spread spectrum systems may be easily jammed by a relatively simple jamming process, wherein several tones or Gaussian noise pulses are injected randomly among the frequency bins. This type of jamming, known as "partial-band" jamming, is recognized in the book by M. K. Simon et al., supra, to cause severe degradation in performance compared to other forms of interference. Partial-band jamming is especially damaging in the case when the jamming system (hereinafter "jammer") is sophisticated enough to follow the signal with high probability. It may be difficult therefore to avoid performance degradation of conventional frequency hopping systems subjected to partial or full band jamming.

There is therefore a need to make frequency-hopped spread spectrum communications more robust in the presence of multiple tone or multiple Gaussian pulse jammers, partial and full band jammers.

In addition to the problems associated with providing anti-jamming capabilities, conventional wireless communication systems do not possess the ability to use the entire radio bandwidth in an adaptive and flexible manner, reflecting the highly-structured nature of legacy radio waveforms and of spectral allocation previously seen in military and civilian communications. This means that spectrum usage is often very fragmented and inefficient, with potentially large portions of the spectrum, though allocated, practically going unused.

The problem of efficient spectral usage is further exacerbated in modern wireless communications by the need to transmit high-bandwidth signals, for example combining audio and video information, or multiple data streams from multiple network users. One known method of wide-band wireless transmission is frequency domain multiplexing (FDM), in particular—orthogonal frequency division multiplexing (OFDM), which enables transmitting information from multiple users at multiple sub-carriers combined in a single OFDM signal. This method enables a multiple user access scheme wherein information from multiple users is transmitted in one contiguous block of frequency spectrum with a relatively high tolerance to multi-path interference. For a system employing frequency hopping, this results in a scheme wherein a wide-bandwidth contiguous-spectrum signal hops over the entire allocated radio bandwidth, with the aim of actively avoiding signal jamming waveforms. This approach however does not enable efficient and adaptive utilization of the entire non-contiguous and often highly-structured radio band available for transmission. Moreover, for certain types of signal jamming such as full or partial band jamming, a degradation in error rate performance or a higher required transmit power is still observed irrespective of the hopping rate of the transmitted signal.

U.S. Pat. Nos. 6,289,038 and 6,215,810 in the name of Park disclose a communication system combining FDM and frequency hopping, wherein, in order to increase robustness of the system against external interference, the same data is sent through several parallel hopping channels. A similar "frequency diversity" approach, in which replicas of the same data signal are sent over multiple frequency subbands, has been previously disclosed in a paper by E. Lance and G. K. Kaleh, entitled "A Diversity Scheme for a Phase-Coherent Frequency-Hopping Spread-Spectrum System," IEEE Trans. Commun., vol. 45, No. 9, p. 1123-1129. However, the increased robustness to external interference in these systems is achieved at the expense of spectral utilization efficiency.

Accordingly, an object of the present invention is to provide a system and method of wireless communications wherein an initially broadband signal is divided into a plurality of narrower-band signals and transmitted over multiple frequency-hopping subbands each having a distinct frequency-hopping sequence for providing a performance gain through frequency diversity and an increased robustness to frequency jamming and muti-path interference without sacrificing spectral utilization efficiency.

Another object of the present invention is to provide a system and method of wireless communications, wherein a broadband signal is divided into multiple narrower-band frequency-hopping subbands each of which has an adaptive frequency-hopping range spread over a full available non-contiguous band of radio frequencies for providing efficient and adaptive utilization thereof with increased robustness to frequency jamming.

It is another object of the present invention to provide a system and method of adaptive wireless communications, wherein a broadband signal is divided into multiple frequency-hopping subbands having individually adjustable subband bandwidths and adaptive modulation parameters for providing efficient and adaptive utilization of available radio bands with increased robustness to interference.

It is another object of the present invention to provide a system and method of adaptive wireless communications, wherein a broadband signal is transmitted in one or more parallel subbands frequency hopping within an adaptive RF spectrum range which is dynamically adapted to spectral distribution of external RF signals for actively avoiding external signal interference.

SUMMARY OF THE INVENTION

In accordance with the invention, a method of transmitting an input data stream having an input data rate via a radio link is provided, comprising the steps of: converting the input data stream into Q parallel data sub-streams $S_q$ using serial-to-parallel conversion, wherein Q>1, q=0, ..., Q-1, and wherein each of the Q parallel data sub-streams $S_q$ carries a different portion of the input data stream, said portion defining a data rate of the sub-stream; for each data sub-stream from the Q parallel data sub-streams generating a carrier waveform having a hopping frequency and modulating the carrier waveform using the data sub-stream according to a modulation format to produce a frequency-hopping subband signal, said sub-band signal having a subband bandwidth related to the corresponding sub-stream data rate; and, forming a multi-subband frequency-hopping RF signal from the frequency-hopping subband signals for transmitting thereof via the radio link using an RF transmitting unit; wherein each of the frequency-hopping subband signals has a different frequency hopping sequence and a frequency hopping range, the frequency hopping ranges being such that at least two of the frequency hopping ranges have at least one common frequency.

In accordance with another aspect of this invention, a method is provided for receiving a multi-subband frequency-hopping RF signal, the method of receiving comprising the steps of: receiving the multi-subband frequency-hopping RF signal comprising a plurality of frequency-hopping subband signals, each centered at a different hopping frequency known to the receiver, with an RF receiving unit; converting the multi-subband frequency-hopping RF signal into a plurality of baseband signals corresponding to the plurality of frequency-hopping subband signals; extracting a plurality of parallel sub-streams of received data symbols from the plurality of baseband signals, wherein each of the parallel sub-streams is extracted from a baseband signal corresponding to a different frequency-hopping subband signal; and, combining the extracted plurality of parallel sub-streams of received data symbols into a sequential stream of data symbols using a parallel-to-serial conversion.

In another aspect of the present invention, a multi-subband frequency-hopping transmitter for transmitting an input stream of data is provided, comprising: input data conversion means for converting the input data stream into Q parallel data sub-streams using adaptive serial-to-parallel conversion, each of the Q parallel data sub-streams carrying a different portion of the input data stream, wherein Q is an integer greater than 1; waveform generating means for generating a frequency-hopping carrier waveform for each of the Q parallel data sub-streams, each of the frequency-hopping carrier waveforms having a different hopping frequency; modulating means for modulating each of the frequency-hopping carrier waveforms with a corresponding data sub-stream using a modulation format to produce Q frequency-hopping subband signals; an RF transmitting unit outputting the Q frequency-hopping subband signals for transmitting via a radio link to a receiver; wherein each of the frequency-hopping carrier waveforms has a distinct frequency hopping sequence and a frequency hopping range, the frequency hopping ranges being such that at least two of the frequency hopping ranges have at least one common frequency.

In another aspect of the present invention, a multi-subband receiver is provided for receiving a multi-subband RF signal comprising a plurality of frequency-hopping subband signals, the receiver comprising: an RF receiving unit for receiving the multi-subband RF signal and for converting each of the plurality of frequency-hopping subband signals into a baseband signal; data extracting means for extracting a plurality of parallel sub-streams of received symbols from the plurality of baseband signals; and, output data conversion means for converting the plurality of parallel sub-streams of received symbols into a sequential stream of data symbols using a parallel-to-serial conversion.

According to a feature of this aspect of the invention, the data extracting means comprises an A/D converter for obtaining a sequence of received waveform samples from each of the baseband signals by sampling thereof; channel estimating means for identifying a pilot sequence in at least one of the sequences of received waveform samples, and for providing subband-level channel estimation based on the identified pilot sequence; channel equalizing means for performing subband-level channel equalization upon each of the sequences of received waveform samples based on the subband-level channel estimation provided by the channel estimating means to form the plurality of parallel sub-streams of received symbols.

In accordance with another feature of the invention, the multi-subband frequency-hopping RF signal has an adaptive characteristic, the adaptive characteristic being one of: a number of the frequency-hopping subband signals in the multi-subband frequency-hopping RF signal, the frequency bandwidth of one of the frequency-hopping subband signals, the frequency hopping range of one of the frequency-hopping subband signals, the frequency hopping sequence of one of the frequency-hopping subband signal, and the modulation format for one of the frequency-hopping subband signal.

Another feature of the invention provides an adaptive method of frequency-hopping transmission of an input data stream via a radio link in one or more parallel subbands each frequency-hopping within a frequency-hopping range, wherein at least one of the frequency hopping ranges is adaptively determined from a spectral distribution of external RF signals using a probabilistic selection of RF frequency regions for reducing external signal interference in the radio link, wherein the spectral distribution of external RF signals is determined on the basis of a spectrally-resolved RF power measurement across an operating frequency band.

In accordance with one aspect of this feature of the present invention, a method of adaptively allocating a frequency hopping range in an RF transmission system with frequency hopping in the presence of an interfering RF signal is provided, the method comprising the steps of a) defining a plurality of RF frequency regions within an operating frequency band of the RF transmission system, b) determining, for each of the plurality of RF frequency regions, an external RF energy parameter using spectrally-resolved RF power measurements of the interfering RF signal, c) computing a probability value for each of the plurality of RF frequency regions from the external RF energy parameters; and, d) selecting one or more RF frequency regions from the plurality of the RF frequency regions using a pseudo-random selection algorithm and the assigned probability values, to form the frequency hopping range.

BRIEF DESCRIPTION OF THE DRAWINGS

The invention will be described in greater detail with reference to the accompanying drawings which represent preferred embodiments thereof, wherein.

DETAILED DESCRIPTION

The instant invention provides an adaptive multi-band method and system of transmitting and receiving a high data rate signal over multiple frequency-hopping subbands efficiently using a radio frequency (RF) band available for transmission, which may be discontinuous, whilst providing robustness to signal jamming and interference in wireless military or commercial communications. The system operates by dividing a single contiguous block of transmitted data over multiple, variable spectral bandwidth, parallel hopping modulated waveforms. Thus, each parallel hopping waveform consists of different data signals, which, when combined in the receiver, produce an effective bandwidth equivalent to that of a single contiguous block of frequency spectrum. This scheme differs from the aforementioned system proposed by Lance et al. for attaining frequency diversity by transmitting replicas of the data signal. Advantages of dividing the single contiguous block of data into parallel subbands include: i) it extends the transmitted symbol period and thus enhances robustness to multi-path interference; ii) it provides frequency diversity allowing an increased performance gain when used with interleaving and forward error correction; and, iii) it increases the system resilience to certain types of signal jamming e.g. continuous wave jamming. We have demonstrated, as will be described more in detail hereinafter, that in certain jamming scenarios there is an optimum number of subbands, with the optimum being, in general, greater than a single subband.

DESCRIPTION OF EXEMPLARY EMBODIMENTS

Figure 1:
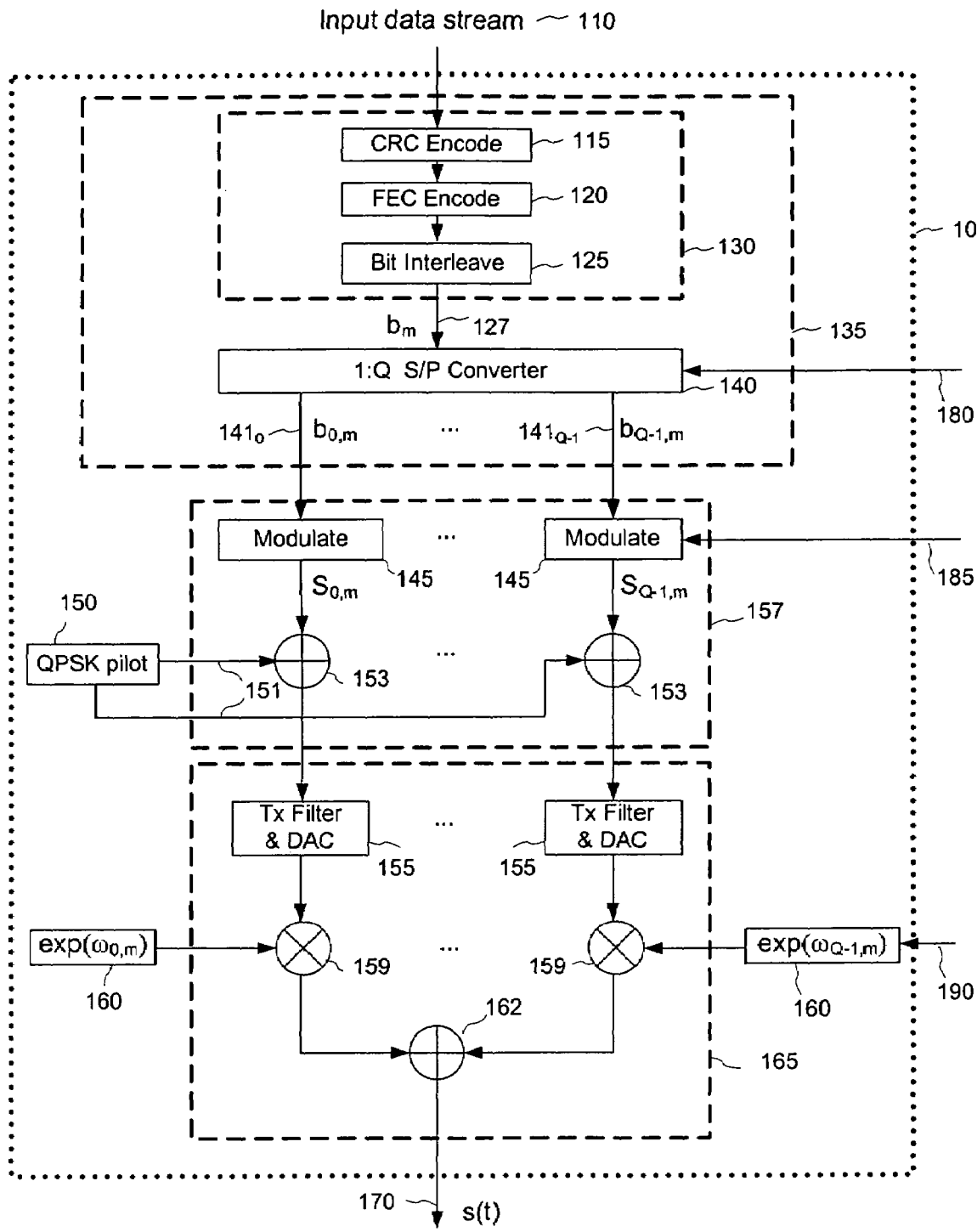
FIG. 1 is a diagram of a multi-subband frequency-hopping transmitter according to the present invention.

An exemplary embodiment of a multi-subband frequency-hopping (FH) transmitter of the present invention for transmitting an input data stream in multiple frequency-hopping RF subbands is shown in FIG. 1 and is hereafter described.

Each block in the diagram shown in FIG. 1 is a functional unit of the transmitter adopted to perform one or several steps of the method of multi-subband frequency-hopped transmission of the present invention in one embodiment thereof; these steps will be also hereinafter described in conjunction with the description of the corresponding functional blocks of the transmitter.

The multi-subband frequency-hopping transmitter 10 receives an input stream 110 of data symbols $b_{in}=[\ldots b_1, b_2, \ldots]$ at an input data rate R bits/sec from an information source, and generates an RF signal s(t) comprising a plurality of modulated frequency-hopping subcarriers. The modulated frequency-hopping subcarriers are also referred to hereinafter as frequency-hopping subband signals, while the sub-carriers themselves are referred to hereinafter as carrier waveforms. In the embodiment described herein, the input data symbols $b_i$ are binary symbols, or information bits; in other embodiments they can be any symbols suitable for transmitting and processing of digital information. The input stream of data symbols 110, also referred to hereinafter as the input data stream or as an input binary sequence, can carry any type of information, including but not limited to digitized voice, video and data.

The transmitter 10 includes input data conversion means 135 for converting the input data stream 110 into Q>1 parallel data sub-streams using serial-to-parallel conversion, each of the Q parallel data sub-streams carrying a different portion of the input data stream. Waveform generating means 160 generates a carrier waveform $\exp(i\omega_q(t))$, wherein $i=\sqrt{-1}$, for each of the Q parallel data sub-streams, each of the carrier waveforms having a different hopping carrier frequency $\omega_q(t) = 2\pi f_q(t)$ at every moment in time, wherein $q=0, \ldots Q-1$ is a subband index. Modulating means 157 modulates each of the carrier waveforms with a corresponding data sub-stream using a pre-selected modulation format to form Q frequency-hopping subband signals. An RF transmitting unit 165 transmits the Q frequency-hopping subband signals via a radio link to a receiver.

The number Q of the subbands depends on a particular system implementation and on the transmission environment, such as transmission noise, external interference and RF bands allocated for the transmission. In the exemplary system embodiments described hereinafter in this specification, Q was found to be preferably between 2 and 8, and, most preferably, 4 to 6.

The modulation format used for each subband signal is preferably multi-level, such as M-QAM or CPM, with an adjustable and generally subband-dependent modulation order M. Hereinafter in this specification the modulation order of a q-th subband will be denoted as $M_q$.

Each of the sub-carriers "hops" in the frequency domain to another sub-carrier frequency $f_{q,m}$ at time moments $t_m = t_0 + m \cdot T_h$, wherein $t_0$ is an arbitrary time offset, $T_h$ is a duration of a time interval between the hops when the sub-carrier frequencies remain constant, and m is a hop index; we will assume here for simplicity that m can take any integer value between $-\infty$ and $+\infty$, i.e. $m = -\infty, \ldots, +\infty$. The time-dependent hopping frequency of a q-th subband can be therefore described by the following equation (1):

$$f_q(t) = \sum_{m=-\infty}^{m=\infty} f_{q,m} \cdot \theta(t - t_m), \quad (1)$$

$$\theta(x) = \begin{cases} 1, & x \in [0, T_h) \\ 0, & x < 0, x \geq T_h \end{cases}$$

The sequence of frequencies $f_q = [\ldots f_{q,m-1}, f_{q,m}, f_{q,m+1}, \ldots]$ for q-th subband will be referred to herein as a subband frequency hopping sequence. The time interval $(t_m, t_{m+1})$ between m'th and (m+1)'th consecutive hops will be referred to hereinafter as an m-th hop interval.

At each hop interval, the Q sub-carrier frequencies $f_{q,m}$, $q=0, \ldots, Q-1$, are selected pseudo-randomly to satisfy the following two conditions: 1) each of the sub-carrier frequencies has to be within a pre-determined subband frequency hopping range $\{f\}_q$, and 2) subband signals cannot overlap, i.e. $|f_{q,m} - f_{q',m}| > \delta$ for all $q \neq q'$, $0 \leq q$, $q' \leq Q-1$, wherein $\delta$ is a frequency guard preferably exceeding a subband signal bandwidth $w_q$. Condition (2) means that each of the frequency-hopping subband signals has a different frequency hopping sequence. A plurality of subband frequency hopping sequences $[f_q]$, $q=0, \ldots, Q-1$, satisfying the above stated conditions will be referred to herein as the plurality of pseudo-random orthogonal hopping sequences.

The subband frequency hopping ranges for at least two of the subbands, and preferably for the majority of the Q subbands, overlap with each other, making the communication system more resistant to external jamming. This overlap is an important feature of the instant invention, which distances it from previously disclosed systems wherein additional frequency bands can be allocated for high data rate channels, so that every channel is confined to a particular band. In contrast to this prior-art arrangement, the frequency-hopping subbands of the present invention preferably share, i.e. hop within the same frequency region, which can be either pre-allocated or dynamically assigned to the communication system of the present invention.

Figure 2:
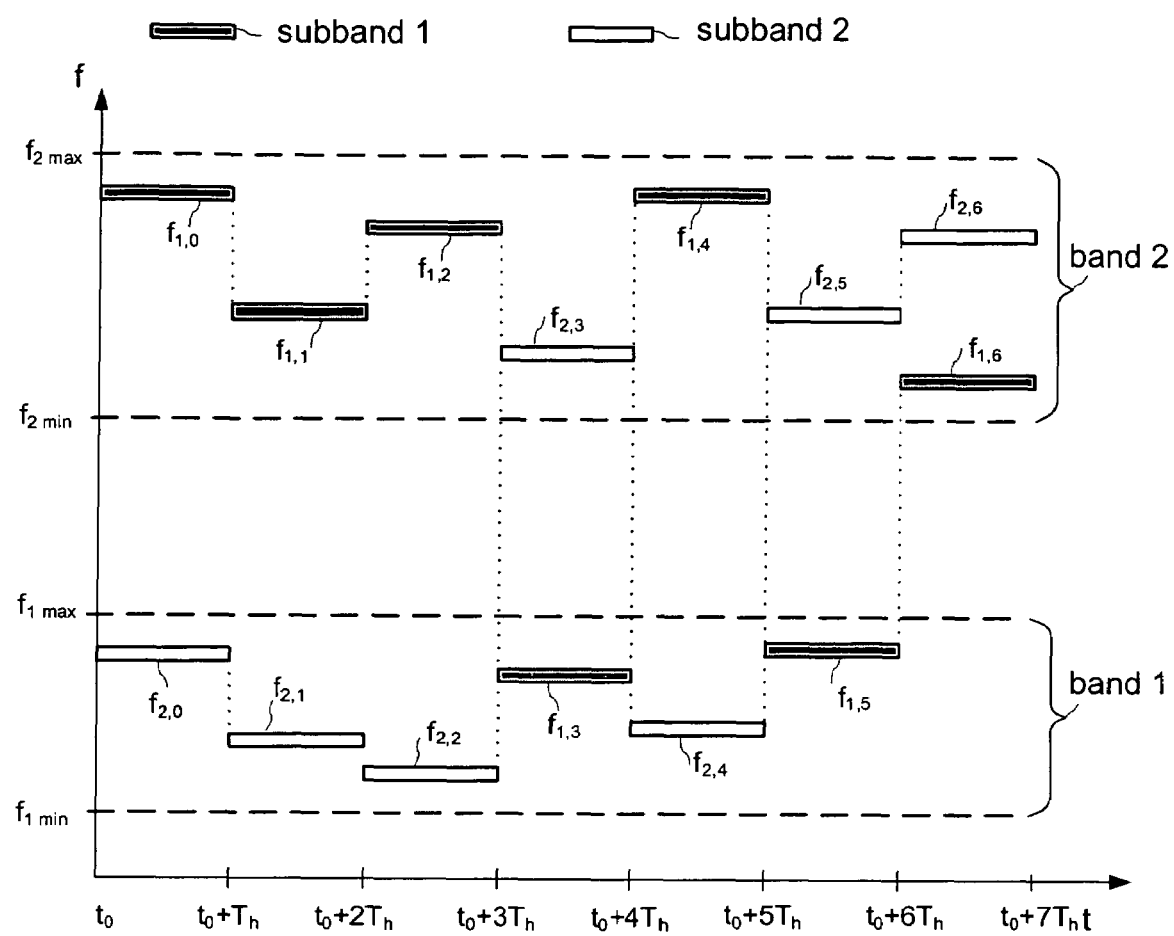
FIG. 2 is a diagram of subband frequency hopping sequences according to an embodiment of the present invention.

By way of example, FIG. 2 shows two frequency-hopping subbands of the present invention, labeled in FIG. 2 "subband 1" and "subband 2", hopping within a non-contiguous frequency region B formed by two RF bands: $B_1 = (f_{1\ min}, f_{1\ max})$ labeled "band 1" in FIG. 2, and $B_2 = (f_{2\ min}, f_{2\ max})$ labeled "band 2", so that $B = B_1 \cup B_2$. At a time moment $t_0$, subband 1, which is shown by dashed stripes, has a sub-carrier frequency $f_{1,0}$ located within the RF band 2, while subband 2, which is shown by open stripes, has a sub-carrier frequency $f_{2,0}$ located within the RF band 1. At time moments $t_m = t_0 + m \cdot T_h$, $m=0$, $1, \ldots, 6$, the subbands 1 and 2 hop to new frequency positions $f_{1,m}$ and $f_{2,m}$ respectively which are selected pseudo-randomly within the whole allocated RF frequency band B, with the limitation that the frequency-hopping subbands cannot overlap at any moment of time. In this example, the subbands 1 and 2 has the same non-contiguous frequency hopping range B, i.e. $\{f\}_1 = \{f\}_2 = B = (f_{1\ min}, f_{1\ max}) \cup (f_{2\ min}, f_{2\ max})$, and at any given moment in time can be either in the same RF band or in different RF bands.

Advantageously, the splitting of the input stream of data in multiple frequency-hopping subbands according to the present invention can be made adaptive to a particular structure of RF bands available for transmission, wherein the number of subbands Q and data rates of the individual subbands, which determine their RF bandwidth, can be adjusted to better utilize the available RF bands. By way of example, the RF band 2 can be too narrow to accommodate a total bandwidth required for transmitting the input data stream without splitting thereof in subbands. In this case, the splitting of the input data stream into several narrow-band frequency-hopping subband signals opens up the RF band 2 for use by the communication system.

Turning back to FIG. 1, functioning of the transmitter 10 of the present invention according to one embodiment thereof will now be described more in detail.

The input data conversion means 135, which receives the input data stream 110 to be transmitted from a data source, is formed by an encoder 130, followed by an adaptive serial to parallel (S/P) conversion unit 140. The encoder 130 in this exemplary embodiment encodes the input stream of data symbols 110 in three stages. First, a sequence of $N_b$ input information symbols from the input data stream is appended by a cyclic redundancy check (CRC) code of length c by a CRC encoding unit 115, and an appended bit sequence of length $(N_b+c)$ is passed to a FEC encoder 120 wherein it is encoded by a forward error correction code of rate k/n producing code words of length n from every k bits input therein. Various FEC codes could be used here, and a person skilled in the art would be able to select an appropriate one for a particular system implementation. Generally, the FEC code and parameters n and k are selected together with other FEC parameters such as constraint length for convolutional codes to ensure that there exists a minimum free distance or Hamming distance between code words. In an exemplary embodiment, which performance is described hereafter in this specification, a conventional convolutional FEC code was used with the rate k/n=½, and a constraint length equal 4. This code is referenced in Table 8.2-1, page 492, of a text book "Digital communications, 4th Edition," by John G. Proakis, McGraw-Hill, 2001, New York.

The encoded bit stream is then interleaved by the bit interleaving unit 125 to avoid bursts of errors in the receiver. The interleaving span is preferably selected to cover multiple subbands, as will be described hereinafter in more details. A resulting sequential stream of encoded binary data symbols 127 is fed to the adaptive S/P conversion unit 140 at a data rate $R' = R \cdot (n/k) \cdot (1+c/N_b)$, wherein it is converted into Q parallel sub-streams of binary data, so that every symbol fed to the S/P converter 140 by the encoder 130 appears in only one of the Q parallel sub-streams $141_0, \ldots, 141_{Q-1}$ of binary symbols, and each said sub-stream is formed from a different portion of the sequential stream of encoded binary data symbols 127 entering the S/P converter 140. The Q sub-streams of data will also be referred to hereinafter in this specification as Q data subbands.

The Q parallel sub-streams of binary data symbols are then fed into the modulating means 157, which in this embodiment are formed by Q modulating units 145, each followed by a transmit filter 155. The modulating units 145 convert their respective input binary sub-streams 141$_0$, ..., 141$_{Q-1}$ into sub-streams $S_q$ of $M_q$-ary symbols, each symbol mapped onto $\mu_q=\log_2(M_q)$ bits, the $M_q$-ary symbols used as complex modulation coefficients to modulate the frequency-hopping carrier waveforms generated by the local oscillators 160 using one of appropriate M-QAM modulation formats, for example a QPSK or a 16-QAM. In other embodiments, alternative multi-level modulation formats can be used, such as continuous phase modulation (CPM), with suitably configured modulating units 145 as would be known to those skilled in the art. Hereinafter in this specification, the parameter $M_q$ will also be referred to as a symbol size, and as a modulation order when used as a modulation coefficient for modulating a carrier waveform.

To facilitate further understanding of the transmission system and method of this invention, the following definitions and notations will now be introduced. Let $b_m$ represent a sequence of binary bits inputted into the S/P converter 140 by the encoder 130, during an $m_{th}$ hop interval:

$$b_m = [b_{0,0,0,m}, b_{1,0,0,m}, \ldots b_{\mu_0,0,0,m}, b_{0,1,0,m}, \ldots, b_{\mu_q,N_{Q-1},Q-1,m}], \quad (2)$$

so that the sequential stream of encoded binary data symbols entering the S/P converter 180 is a sequence [ ... $b_{m-1}$, $b_m$, $b_{m+1}$, ...] of the sequences of binary bits $b_m$ for consecutive hop intervals. Let further $b_{q,m}$ represent a corresponding q-th binary sub-sequence outputted from the S/P converter 140 from a qth output during an $m_{th}$ hop interval, $q=0,\ldots,Q-1$, $b_m = [b_{0,m},\ldots,b_{Q-1,m}]$:

$$b_{q,m} = [b_{0,0,q,m}, b_{1,0,0,m}, \ldots b_{\mu_q-1, N_q-1, q, m}]. \quad (3)$$

The Q binary sub-sequences $b_{q,m}$ are then mapped by the modulating units 145 onto Q sub-sequences $s_{q,m}$ of $M_q$-ary symbols $S_{k,m,q}$, wherein $k=0,\ldots,N_q-1$, and $N_q$ is the number of $M_q$-ary symbols in the $q^{th}$ sub-sequence $s_{q,m}$:

$$S_{q,m} = [S_{0,m,q}, S_{1,m,q}, \ldots, S_{N_q-1,m,q}], \text{ for } q=0,1,\ldots Q-1, \quad (3)$$

so that each of the Q sub-streams $S_q$ is formed by the sub-sequences $s_{q,m}$ for consecutive hop intervals: $S_q = [\ldots, s_{q,m-1}, s_{q,m}, s_{q,m+1}, \ldots]$.

Symbol $b_{n,k,q,m}$ in equations (2) and (3) denotes the $n^{th}$ bit mapped onto the $k^{th}$ QAM symbol in the $q^{th}$ sub-sequence $s_{q,m}$ for the $m^{th}$ hop duration, $n=0,\ldots,\mu_q-1$. The number of bits $N_b$ in the sequence $b_m$, or its length, is given by equation (4):

$$N_b = \sum_{q=0}^{Q-1} N_q \mu_q, \quad (4)$$

wherein the product $N_q \cdot \mu_q$ are the number of bits into the $q^{th}$ sub-sequence $b_{m,q}$: $N_{b\,q} = N_q \cdot \mu_q$.

The S/P converter 140 divides each input binary block $b_m$ into Q portions of length $N_{b\,q}$ each, $q=0,\ldots,Q-1$, and sends each portion to a different data sub-stream, or subband. In one exemplary embodiment, the P/C converter 140 divides each block $b_m$ of $N_b$ bits input therein between the Q subbands in equal fractions, with $N_{b\,q} = N_b/Q$ bits from the block $b_m$ per subband, each of the data subbands having than the same data rate of R'/Q bits per second.

In a preferred embodiment, however, the S/P converter 140 is capable of adjusting the fractions $\eta_q = N_{b\,q}/N_b$ of the input block of symbols $b_m$ sent to individual output sub-sequences $b_{q,m}$, the fractions $\eta_q$ also known as splitting ratios, which therefore can differ from one another. This enables adjustment of the data rates $R_q = \eta_q \cdot R'$ of the individual sub-streams, and the associated subband frequency bandwidths $w_q$, thereby enabling better adaptation of the communication system to the transmission environment of the radio link.

Furthermore, in the preferred embodiment the modulating units 145 are adaptive, so that not only the sub-stream data rates $R_q$, but also the modulation formats, e.g. modulation orders $M_q$, can be adjusted, thereby advantageously enabling further adjustment of frequency bandwidths $w_q$ of individual subbands to optimize the transmission system performance for a particular transmission environment and available RF transmission bands.

In a next step, a pilot sequence of symbols provided by a pilot sequence generator 150 is added to each subband prior to the information-bearing sub-sequence $s_{q,m}$ during each hop interval, as schematically shown in FIG. 1 by arrows 151, to be used at the receiver for subband-level channel estimation, as will be described hereinafter. The pilot generators 150, together with summation units 153, will also be referred to hereinafter in this specification as pilot insertion means. Pilot sequences for channel estimation, as well as pilot insertion means, are well known in the art, and their particular implementation will not be described herein in any further detail. In some embodiments, e.g. if the transmission channel characteristics are expected to be fairly uniform across the available RF frequency band, or/and are expected to vary with time only slowly compared to a hop interval $T_h$, the pilot sequences can be inserted not in every subband, and/or not for each hop interval. The pilot sequences added to different subbands can be identical or they may differ, e.g. depending on the subband data rate and/or expected subband noise and interference in the communication link.

By way of example, in the exemplary embodiment considered herein, the pilot sequences are identical QPSK symbol sequences which are inserted at the beginning of each of the Q information-bearing sub-sequences $s_{q,m}$ to form Q parallel sub-streams of complex data symbols.

Finally, these Q parallel sub-streams of complex data symbols are sent to the RF transmitting unit 165, which is embodied using a bank of Q DAC/Tx filter units, followed by Q RF mixers 159 and an RF combiner 162. The Q parallel sub-streams of complex data symbols are digitized and shaped in the frequency domain by adaptive transmission filters incorporated in the DAC/Tx filter units 155, and used by RF mixers 159 to modulate the frequency-hopping harmonic signals, or carrier waveforms, provided by the signal generators 160, which include local oscillators and frequency controllers defining the Q pseudo-random hopping frequencies of the respective subbands.

The resulting frequency-hopping subband signals are combined by the RF signal combiner 162 into one multi-subband frequency-hopping signal. This signal can then be further frequency up-converted as required, and then transmitted over the communication link with an antenna.

The resulting transmitter signal s(t) at the output of the transmitter can be written as:

$$s(t) = \sum_{m=-\infty}^{m=\infty} \sum_{q=0}^{Q-1} \theta(t - t_m) \text{Re}\{s_{q,m}(t) e^{i\omega_{q,m}(t)}\}, \quad (5)$$

where $\theta(t)$ is a unit amplitude rectangular pulse of a duration $T_h$, which is defined in equation (1), Re{●} represents the real part of {●} ω$_{q,m}$ are the hopping frequencies for each subband, which are selected to ensure negligible adjacent carrier interference and can vary for each hop interval. The complex time-dependent modulation functions s$_{q,m}$(t) are the frequency-shaped transmitted symbol sub-sequences s$_{q,m}$ in the mth hop interval, which can be described by the following equation (6):

$$s_{q,m}(t) = \sum_{j=0}^{N_q-1} s_{q,m}(j) g_q(t - t_m - jT_q), \quad q = 0, \ldots, Q-1 \quad (6)$$

where $T_q$ is the symbol period for the q-th subband signal, and $g_q$(t) is the impulse response of the pulse shaping filter of the q-th subband. In the exemplary embodiments for which simulation results are provided hereinafter in this specification, the filter g(t) is a root raised cosine filter with a roll-off factor β=0.22.

Figure 3:
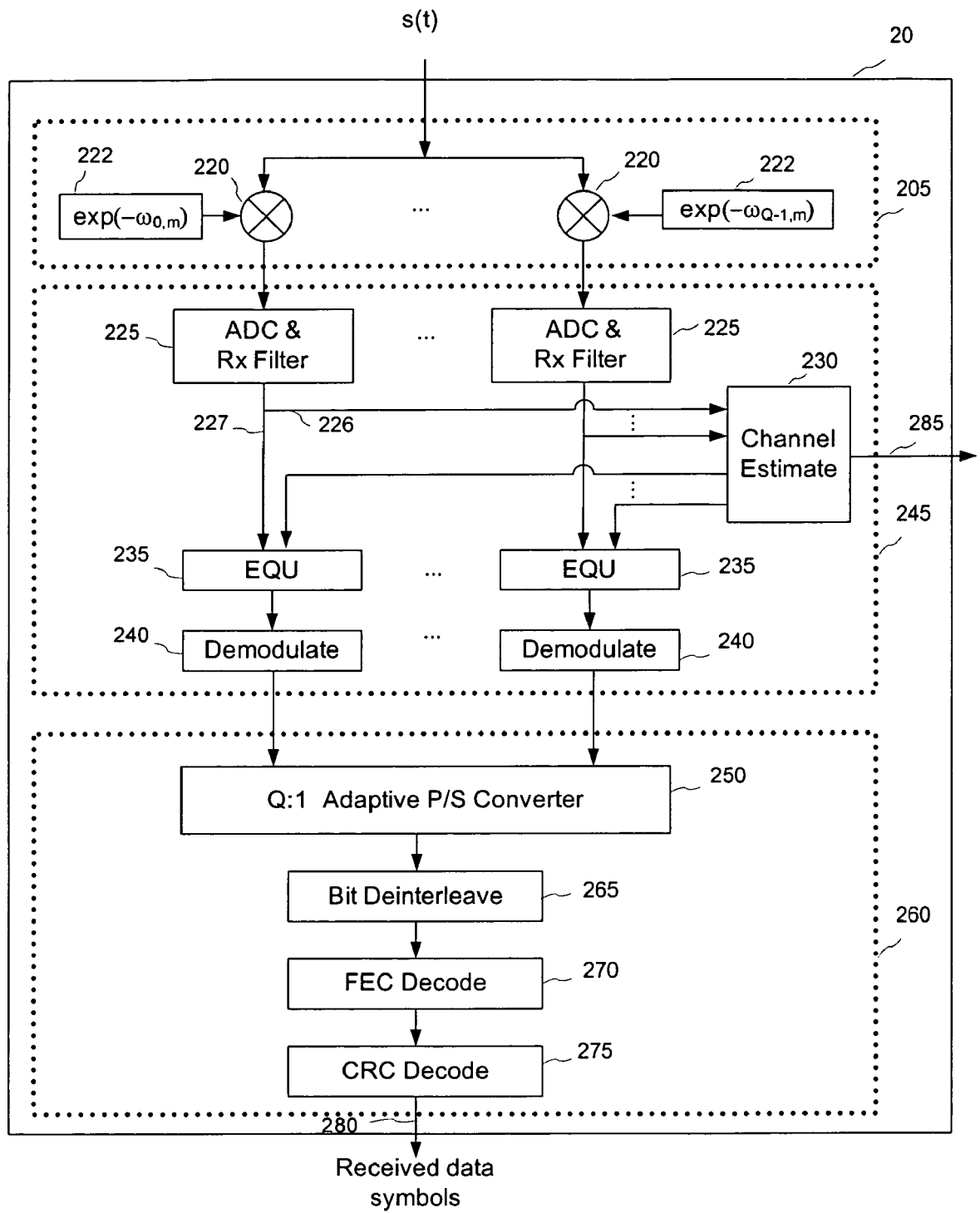
FIG. 3 is a diagram of a multi-subband receiver according to the present invention.

The various functional units shown as blocks in FIG. 1, as well as the corresponding functional units having similar functions which are shown in FIG. 3 described hereinbelow, can be integrated or separate structures implemented in either software or hardware or a combination thereof commonly known to provide the aforedescribed functionalities, including DSPs, ASICs, FPGAs, and analogue RF, HF and UHF circuitry. For example, the data conversion means 135, the modulating means 157 and the pilot generator 150 are preferably implemented in digital hardware, namely a DSP/FPGA chipset programmed with a corresponding set of instructions. The carrier waveform generators 160, and similar generators 222 shown in FIG. 3, can be implemented as a digital generator which generates the digitized frequency-hopping sinusoidal carrier waveforms and outputs them through an incorporated D/A converter to the analogue RF mixers 159 and 220. Alternatively, the generation of the frequency-hopping sinusoidal carrier waveforms can be achieved using an analogue phase locked loop (PLL) having a reference digital input to define the discrete hopping frequencies. The RF transmitting unit 165, and a corresponding RF receiving unit 205 shown in FIG. 3, is preferably implemented using analogue circuitry due to the high transmission frequencies involved, as would be obvious to those skilled in the art.

Additionally, as those skilled in the art would appreciate, the RF transmitting unit 165 can include an additional RF mixer following the signal adder/combiner 162 and an additional HF or UHF carrier generator for frequency up-conversion of the frequency-hopping subband signals when required, for example into one of the 300 MHz, 2.4 GHz or 5 GHz bands, followed by a power amplifier and an antenna. These additional blocks are commonly employed in RF transmitters and are not shown in FIG. 1.

By way of example, a multi-subband communication system including the transmitter 10 of the present invention has a total operating bandwidth of 100 MHz. The signal combiner 162 outputs a multi-subband frequency-hopping signal in the frequency range 0 Hz-100 MHz. This intermediate-frequency (IF) signal is then multiplied by an additional RF carrier signal, for example a 2 GHz, 5 GHz, or 300 MHz carrier. As would be obvious to those skilled in the art, image rejection filters can be inserted in the signal paths following each of the aforementioned mixers, e.g. the mixers 159, and the adder 162, to reject all frequencies outside of the corresponding operating bandwidths.

The transmitter output signal s(t), after propagating though the radio communication link where it experiences linear distortions and external signal interference in the form of additive noise and, possibly, jamming, is received by a multi-subband receiver of the present invention adapted for converting the frequency-hopping multi-subband RF signal into a binary sequence closely approximating the input binary sequence 110 inputted into the transmitter 10 as described hereinabove. An embodiment of the multi-subband receiver of the present invention for receiving a stream of data symbols transmitted using the aforedescribed transmitter, is shown in FIG. 3 and will now be described.

Similarly to FIG. 1, each block in the diagram shown in FIG. 3 is a functional unit of the receiver adopted to perform one or several steps of the method of receiving of the multi-subband frequency-hopped signal of the present invention in one embodiment thereof; these steps will be also hereinafter described in conjunction with the description of the corresponding functional blocks of the receiver.

The multi-subband receiver 20 includes an RF receiving unit 205, which is formed by an RF antenna (not shown), a 1:Q RF splitter followed by Q local oscillators 222 and Q RF mixers 220. The local oscillators 222 are synchronized to the corresponding local oscillators 160 of the transmitter, and, when the multi-subband frequency-hopping RF signal comprising a plurality of frequency-hopping subband signals each centered at a different hopping frequency $f_{q,m}$ known to the receiver 20 is received, produce harmonic RF signals following the same subband hopping frequency sequences $f_{q,m}$ as those used by the transmitter 10. The RF receiving unit thereby converts the received multi-subband frequency-hopping RF signal into a plurality of baseband signals $r_{q,m}$(t) corresponding to the plurality of frequency-hopping subband signals. Assuming a perfect transmitter-receiver synchronization, the resulting qth baseband signal $r_{q,m}$(t) at the output of the RF receiving unit 205 during the m-th hop interval satisfies the following equation (7):

$$r_{q,m}(t) = \sum_{m=-\infty}^{\infty} \sum_{l} s_{q,m}(t - \tau_l(t)) h_{q,m}(\tau_l, t) + w_{q,m}(t) + J_{q,m}(t) \quad (7)$$

where $h_{q,m}(\tau_l, t)$ represents a time variant complex channel gain at a transmission delay time $\tau_l$, $w_{q,m}$(t) represents additive white Gaussian noise with a two-sided spectral density of $N_0/2$, and $J_{q,m}$(t) is an additive jamming and/or interference signal present in the qth subband and the mth hop interval.

The Q parallel baseband signals $r_{q,m}$(t), q=0, . . . , Q−1, are then passed onto data extracting means 245 for extracting Q parallel sub-streams of received data symbols therefrom, so that each of the parallel sub-streams of received data symbols is extracted from a different baseband signal. The data extracting means 245 are formed in this embodiment by a bank of receive filter/ADC units 225, one unit per received subband followed by a subband channel equalizer 235 and a demodulating unit 240. They can be implemented in digital hardware, namely a DSP/FPGA chipset programmed with a corresponding set of instructions.

Each of the receive filter/ADC units 225 includes a pulse-matched filter and an A/D converter. A qth baseband signal is first sampled therein at a sampling rate $1/T_s$ preferably exceeding the symbol rate $1/T_q$ by an oversampling factor $T_q/T_s > 1$, and then filtered by the corresponding pulse matched filter. The output of each of the ADC/Rx filter units 225 during the mth hop is a sequence of received waveform samples $y_{q,m}(n)$ down-sampled to the symbol rate $1/T_q$, which is given by the following equation (8):

$$y_{q,m}(n) = \sum_{l=0}^{L-1} s_{q,m}(n-l)f_{q,m}(l,n) + I_{q,m}(n), \qquad (8)$$

where n is a time sample index, $mN_q<n<(m+1)N_q$, $f_{q,m}(l,n)$ is an equivalent low-pass complex digital filter function representing a combined filtering effect of the transmit filter $g_q(t)$, the communication channel $h_{q,m}(t)$ and the receiver filter $g^*_q(-t)$, where the asterisk "*" represents the complex conjugation operation, which is matched to the transmitter, for the qth subband during the mth hop, I(n) represents the sampled additive combination of the interference terms J(n) and w(n) filtered by the corresponding receiver matched filter 225, and L represents a multi-path delay spread of the radio link over all subband channels.

The output $y_{q,m}(n)$ of each of the ADC/Filter units 225 is then forwarded to a channel estimating unit 230, and, in parallel, to a corresponding subband equalizer 235, as schematically shown by arrows 226 and 227 for one of the receiver subband chains. The channel estimating unit 230 is programmed to identify the pilot sequences in the sequence of received waveform samples for each subband, to perform subband-level channel estimation, i.e. to estimate the equivalent channel filter, $f_{q,m}(l, n)$ and to supply the channel estimation information to a corresponding equalizer 235. The channel equalizers 235 then use the subband-level channel information provided by the channel estimator 230 to extract Q parallel sub-sequences of $M_q$-ary symbols $s_{q,m}=[s_{q,m}(n)$, $n=mN_q, \ldots, (m+1)N_q]$, $q=0, \ldots, Q-1$, for each hop interval, the Q parallel sub-sequences forming Q parallel sub-streams of recovered data symbols $S_{n,q,m}$ over consecutive hop intervals.

Each of the Q parallel sub-sequences $s_{q,m}$ of the $M_q$-ary data symbols recovered during mth hop interval is then forwarded to a respective demodulator 240, which functions to reverse the aforedescribed action of the modulators 145 of the transmitter 10 shown in FIG. 1. Namely, the demodulators 240 map each of the recovered $M_q$-ary data symbols $s_{q,m}(n)$ to a block of $\mu_q$ bits, thereby producing Q parallel binary sub-sequences $b_{q,m}$, $q=0, \ldots, Q-1$, for each hop interval. The Q parallel binary sub-sequences $b_{q,m}$ are then fed into output data conversion means 260, which converts the Q parallel binary sub-streams [ ... $b_{q,m}$, $b_{q,m+1}, \ldots$ ], $q=0, \ldots, Q-1$, into a sequential stream of binary data symbols approximating the binary input stream of data symbols 110 of the transmitter 10. For the system embodiment described herein, the data conversion means is formed by a parallel-to serial converter 250, which combines the Q parallel sub-streams of received data symbols into a sequential stream of data symbols using a parallel-to-serial conversion, followed by a 3-stage decoder mirroring the encoder 130 of the transmitter 10, i.e. including a bit de-interleaving unit 265, a FEC decoder 270 and a CRC decoder 275. The output data conversion means 260 can be implemented in the same DSP/FPGA chipset as the data extracting means 245, or using a separate DSP.

A number of methods of channel estimation and equalization known in the art can be effectively implemented in the channel estimating and channel equalizing units 230 and 235 in accordance with the present invention. The channel estimating and channel equalizing units 230 and 235 can be embodied using appropriate instruction sets programmed into the same DSP/FPGA chipset at the data extracting block 245, or using a separate processor. Advantageously, the multi-subband transmission scheme of the present invention enables an embodiment wherein the channel equalization for high data rate signals is simplified compared to a conventional single carrier system, which is described hereinbelow.

Indeed, the method of the present invention enables transmitting the high data rate signal, which would occupy a wide transmission bandwidth for the conventional system, over multiple narrow subbands. These subbands can be formed so that each of the subband bandwidths $w_q$, $q=0, \ldots, Q-1$, is less than the coherence bandwidth of the communication channel, thereby ensuring that the equivalent transmission channel for each individual subband frequency is flat. This implies that $f_{q,m}(l,n)=f_{q,m}(n)\delta(l)$, where $\delta(\bullet)$ is the Kronecker delta function, and the equivalent low pass filter $f_{q,m}(l,n)$ satisfies the following equation (9):

$$f_{q,m}(n)=\alpha_{q,m}(n)e^{-j\theta_{q,m}(n)} \qquad (9)$$

The hopping rate $1/T_h$ is preferably sufficiently large so that the hopping period $T_h$ is much smaller than a coherence time $T_c$ of the channel, and the channel can be described with a gain coefficient that remains constant over one hop interval; therefore the parallel sequences of waveform samples $y_{q,m}(n)$ input to the equalizers 235 during mth hop interval satisfy a simpler equation (10):

$$y_{q,m}(n)=s_{q,m}(n)a_{q,m}+I_{q,m}(n), mN_q<n\leq(m+1)N_q \qquad (10)$$

where a complex coefficient $a_{q,m}=\alpha_{q,m}e^{-j\theta_{q,m}}$ represents the complex channel gain which remains constant over the hop interval. Equation (10) holds if the complex channel gain coefficients $a_{q,m}$ and $a_{u,v}$ are uncorrelated for $q\neq u$ and $m\neq v$, which is typically a valid approximation for the pseudo-random frequency hopping sequences.

The channel estimating unit 230 in this embodiment estimates the term $a_{q,m}$ in the received signal by extracting channel information from the pilot symbols and then averaging over all pilot symbols in a hop interval, to produce a channel gain estimate $\hat{a}_{q,m}$ which is forwarded to the gain equalizing unit 235.

In a frequency-flat slow fading channel, the averaging of pilot information reduces the noise of the channel estimate. However, the received signal may be still corrupted by the additive interference term I(n), of which the jamming signal, when present, has a dominant effect in the degradation of the BER performance of the transmission system.

Advantageously, the method of the present invention, wherein the input data stream 110 is transmitted over multiple substantially independent frequency-hopping subbands, allows to adaptively change one or several characteristics of the transmitted multi-subband signal to better adapt to the transmission environment, thereby further optimizing the transmission performance.

By way of example, in one embodiment the channel estimation unit 230 is programmed to perform subband-level estimation of a transmission quality characteristic for each subband signal for a hop interval, and then forms from said characteristics a feedback signal F. This feedback signal is then outputted from a communication port 285 for communicating to the remote transmitter 10 over the communication link using either a virtual channel setup within a data stream of a reverse channel, or using a dedicated control channel as known to those skilled in the art. The subband-level transmission quality characteristic computed by the channel estimation unit 230 can be, for example, a signal to interference-plus-noise ratio (SINR) computed from the subband sequences of the waveform samples $y_{q,m}(n)$ by estimating energies of the non-signal, i.e. "interference plus noise" component $I_{q,m}(n)$, and the signal, or data component thereof $s_{q,m}(n)$, and computing their ratio. Various methods of SINR estimation are known, and adapting them for the system of this invention would be obvious to one skilled in the art. The feedback signal F is then communicated to the transmitter 10 and passed to at least one of the S/P converter 140, the Q modulating units 145, and the frequency controllers of the signal generators 160, as illustrated by the arrows 180, 185 and 190 in FIG. 1, for adaptively adjusting at least one of: i) the number Q of the frequency-hopping subband signals, and ii) the bandwidth $w_q$, frequency hopping range, frequency hopping sequence, or modulation format of one of the frequency-hopping subband signals. In an alternative embodiment, the subband-level transmission quality characteristic can be an error rate estimate per subband per hop interval $R_{err}(q,m)$. These estimates can be obtained by inserting in the receiver 20 shown in FIG. 3, an optional CRC decoder, or any other suitable decoder capable of outputting $R_{err}(q,m)$ values, after each of the demodulator units 240 and before the adaptive P/S converter 250, with a set of corresponding encoders inserted in the transmitter 10 before each of the modulator blocks 145.

An article entitled "Adaptive use of Spectrum in Frequency Hopping Multi-Band Transmission," published in Proc. IST-054 Symposium on Military Communications, Apr. 18-19, 2005, and incorporated herein by reference, which is authored by the inventors of the present invention, discloses an adaptive method of selecting regions of the available RF frequency band with little or no jammer power for transmitting the multi-subband frequency-hopping RF signal of the present invention, thus actively avoiding areas of the RF spectrum with relatively large jammer and/or interference signals I(n). This method of hopping range adaptation is described hereafter in this specification.

However, even without adaptive spectrum selection techniques, a considerable gain in the BER performance is still achieved using the multi-subband transmission approach of the present invention in comparison to a conventional single carrier system, due primarily to the frequency hopping nature of the transmission scheme and the inherent time diversity achieved by interleaving over multiple parallel subbands.

Simulation Results without Adaptive Spectrum Selection

Results of computer simulations of a communication system of the present invention including the aforedescribed multi-subband frequency-hopping transmitter and the multi-subband receiver of the present invention will now be presented. In the simulations, the performance of a conventional single subband communication system was compared with a number of implementations of the multi-subband system of the present invention in a variety of jamming scenarios. The modulation format used in simulation was QPSK, corresponding to $M_q=4$ for all subbands. The communication channel was modeled as distortion-free with additive white Gaussian noise. Except where indicated, the results presented hereinbelow show BER performance for un-coded waveforms, so that the effects of jamming can be more readily quantified. The observed performance trends can be extrapolated to higher order linear modulation formats, and also to non-linear modulation formats, such as continuous phase modulation (CPM).

Partial Band Noise (PBN)

Figure 4:
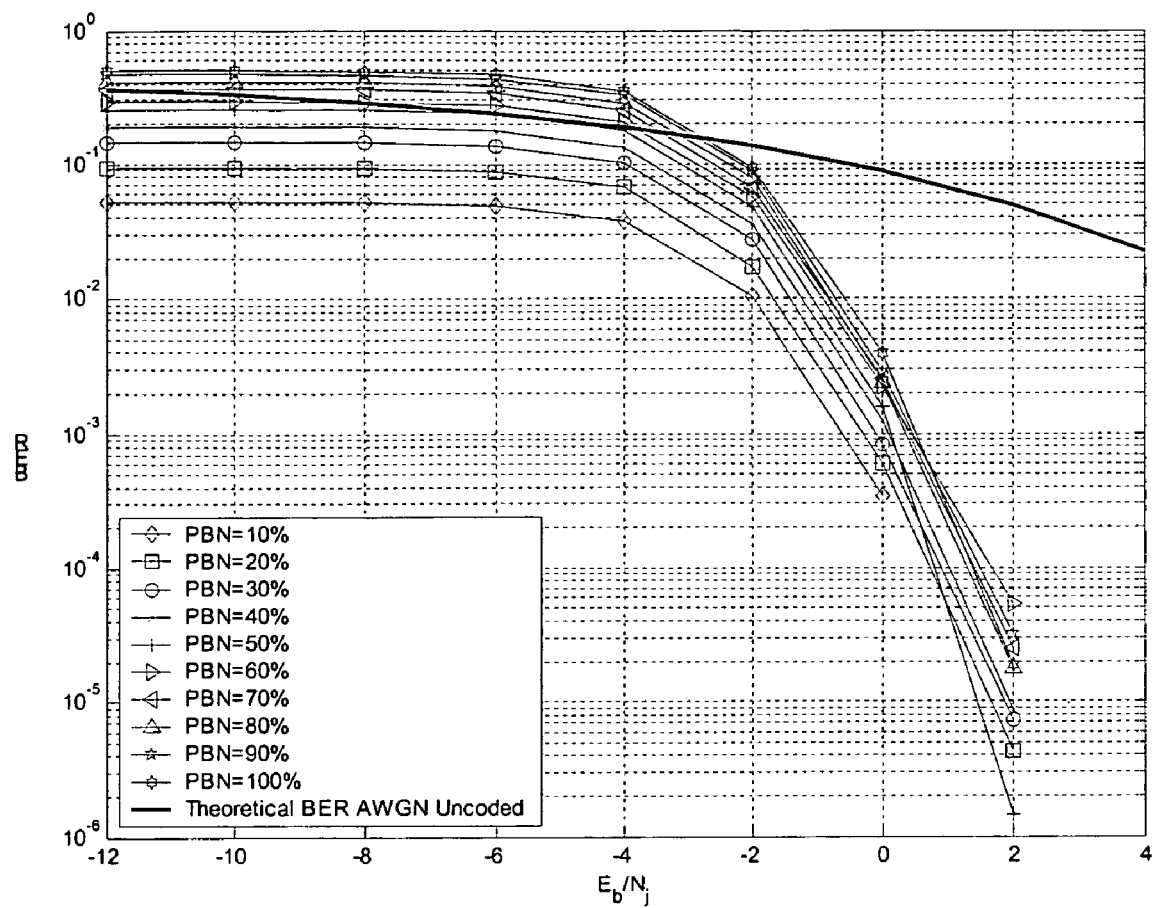
FIG. 4 is a graph of simulated BER performance for a conventional single-carrier communication system under PBN jamming.
Figure 5:
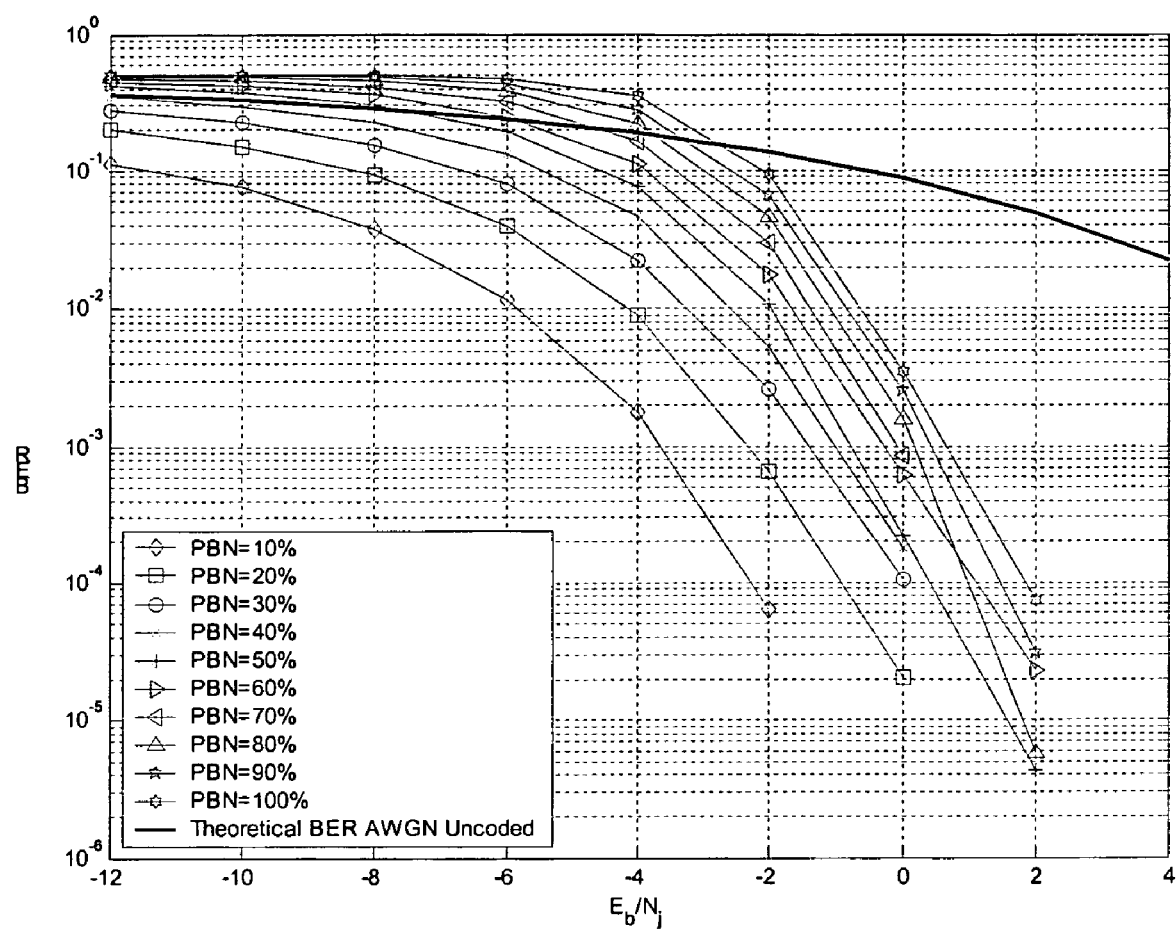
FIG. 5 is a graph of simulated BER performance under PBN jamming for a 5 subband communication system having same total bandwidth as the system of FIG. 4.

FIGS. 4 and 5 show the bit error rate (BER) performance of a conventional single-carrier system having a single 5 MHz transmission bandwidth, hereinafter referred to as the 1×5 MHz system, and an equivalent multi-subband system of the present invention transmitting the same information over five 1 MHz subbands respectively, hereinafter referred to as the 5×1 MHz system, when subject to partial band noise jamming. The total UHF operating bandwidth was 175 MHz, and the frequency hopping rate for the simulations was 1000 hops per second. PBN jamming was simulated by adding a white Gaussian noise jamming signal, over the band of interest, for a residual signal-to-noise ratio $E_b/N_0=10$ dB. The BER curves in FIGS. 4 and 5 represent the performance when a varying percentage of the operating band is subject to jamming; thus PBN=100%, which is equivalent to full band noise (FBN) jamming, means that the entire operating band was subject to jamming, and hence, for this case, the BER performance will be equivalent for all multi-band transmission schemes.

To illustrate the potential BER advantage of using multiple subbands, FIGS. 4 and 5 show the performance for QPSK modulation with a rate ½ convolutional FEC code. In FIG. 4, the BER performance for various PBN jamming appears to track the 100% jamming curve closely. In contrast to this feature of the conventional single-carrier system, the jamming curves in FIG. 5 depicting results for the 5-subband system of the present invention, are spread out as a function of the percentage PBN. Comparing the two figures, a clear gain in BER performance for the 5×1 MHz system can be observed in a wide range of band noise coverage.

The observable gain in BER performance can be attributed to the frequency diversity effect provided by the method of the present invention, which enables the recovery of additional errors when a fraction of the subbands is jammed. A further diversity gain in the multi-subband scheme of the present invention is achieved due to the bit interleaving performed by the encoder block 125 in FIG. 1, when the interleaving span, i.e. a time delay between two originally neighboring bits in the output of the interleaver 125, is large enough to span multiple subbands, or frequency dwell times. The frequency diversity provided by the multi-subband transmission according to the method of the present invention, when combined with this large-span interleaving following by the de-interleaving step 265 at the receiver 20, enables the receiver 20 to recover bursts of errors arising when a subband hops to a "jammed" portion of the transmission band, at a cost of adding a fixed time delay equal to the interleaving span at the receiver. Expanding the interleaving span further over multiple hop intervals enables attaining additional performance gains by exploiting both the time and frequency diversity.

Multi-Tone Jamming

Figure 6:
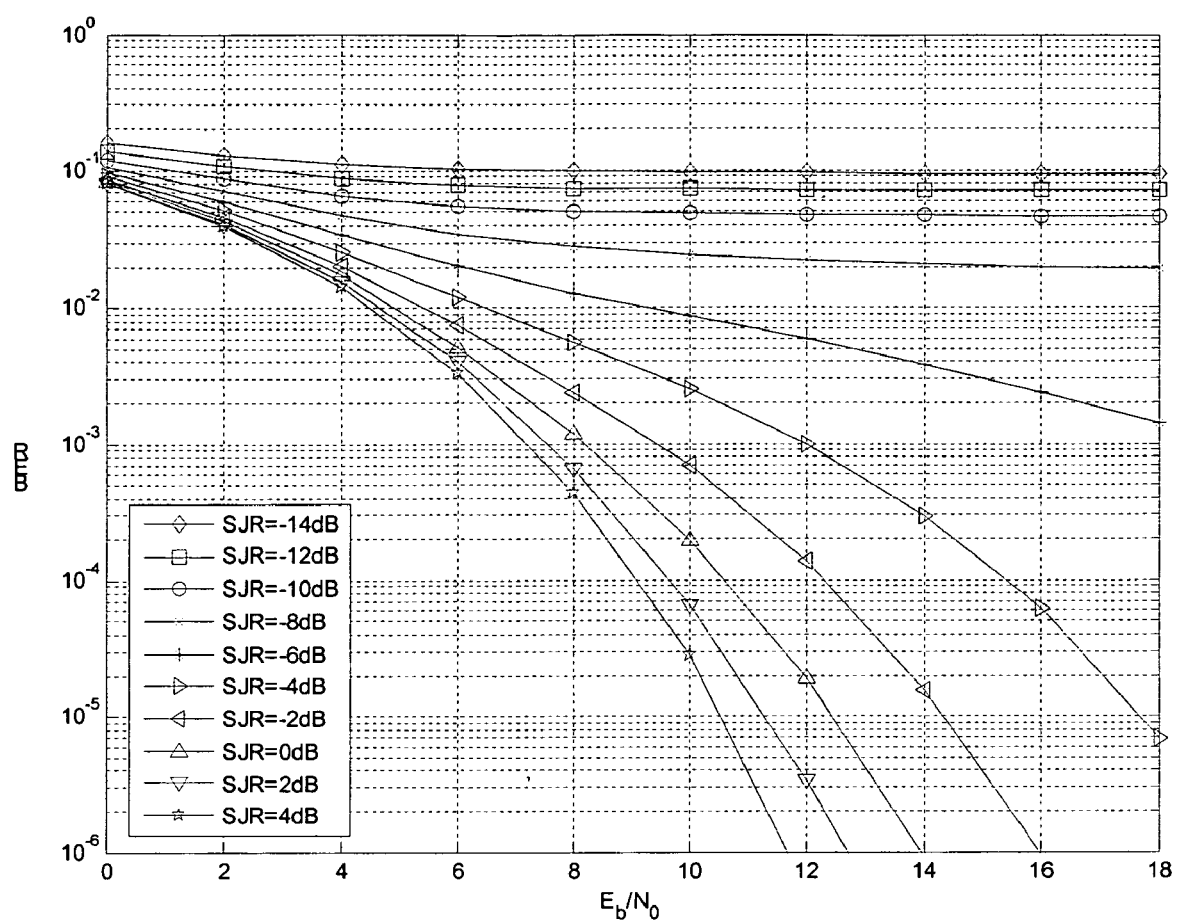
FIG. 6 is a graph of simulated BER performance for a conventional single-carrier communication system under multi-tone jamming.
Figure 7:
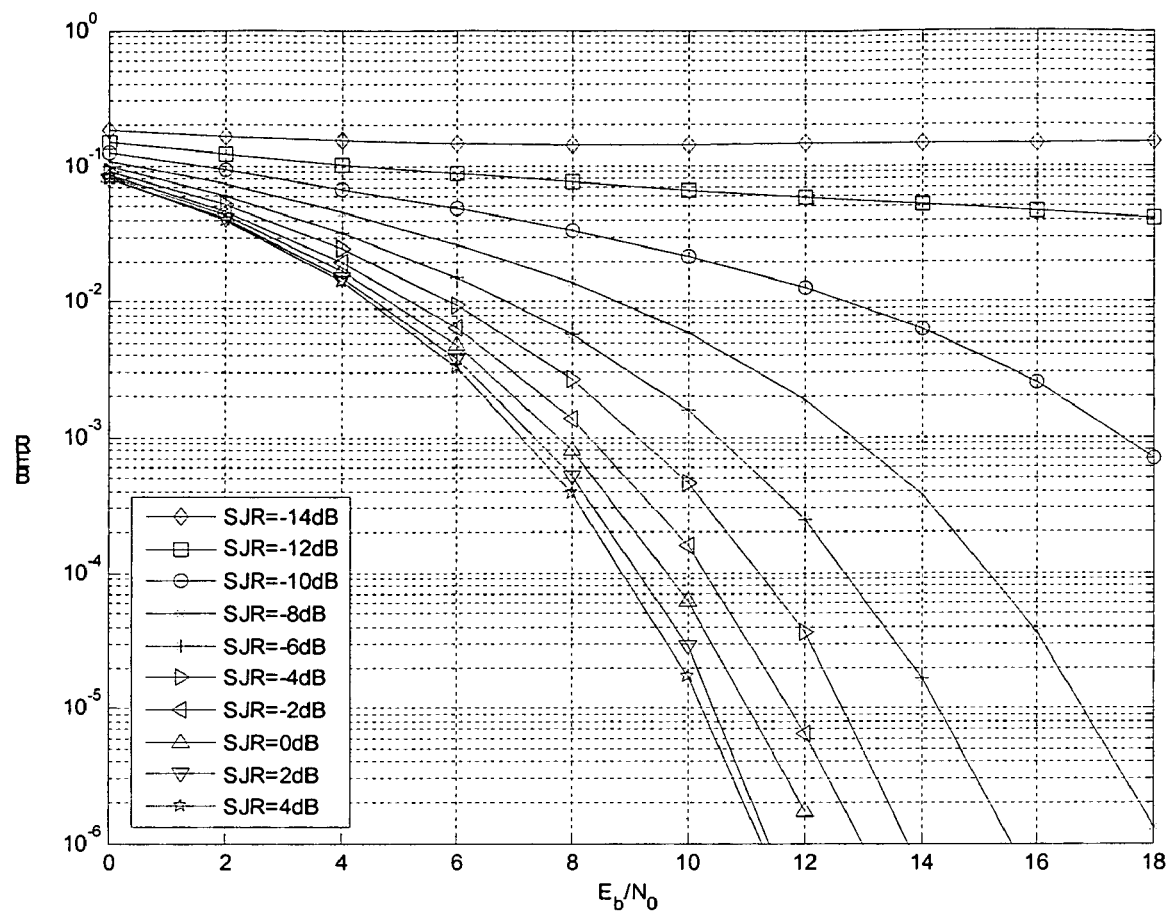
FIG. 7 is a graph of simulated BER performance under multi-tone jamming for a 5 subband communication system having same total bandwidth as the system of FIG. 6.

FIGS. 6 and 7 show the BER performance of the 1×5 MHz system and the 5×1 MHz system respectively, subject to multi-tone (MT) jamming. The jammer waveform consisted of 175 jamming tones evenly distributed over the UHF operating band. The figures clearly show that, as the signal to jammer ratio (SJR) is decreased, the 5×1 MHz scheme of the present invention is more robust to this particular form of jamming compared to the conventional 1×5 MHz scheme, with the limiting case on performance for the conventional system being for a SJR=−8 dB. The results shown in FIG. 6 demonstrate that for a single subband scheme an SJR=−8 dB yields an irreducible error floor in the BER performance and thus makes the scheme unsuitable for reliable communications. In contrast, FIG. 7 shows that the multi-band scheme increases tolerance to jamming by 4 dB in SJR compared to the single wideband transmission for the same total bit rate, at no increased cost in bandwidth or power.

Figure 8:
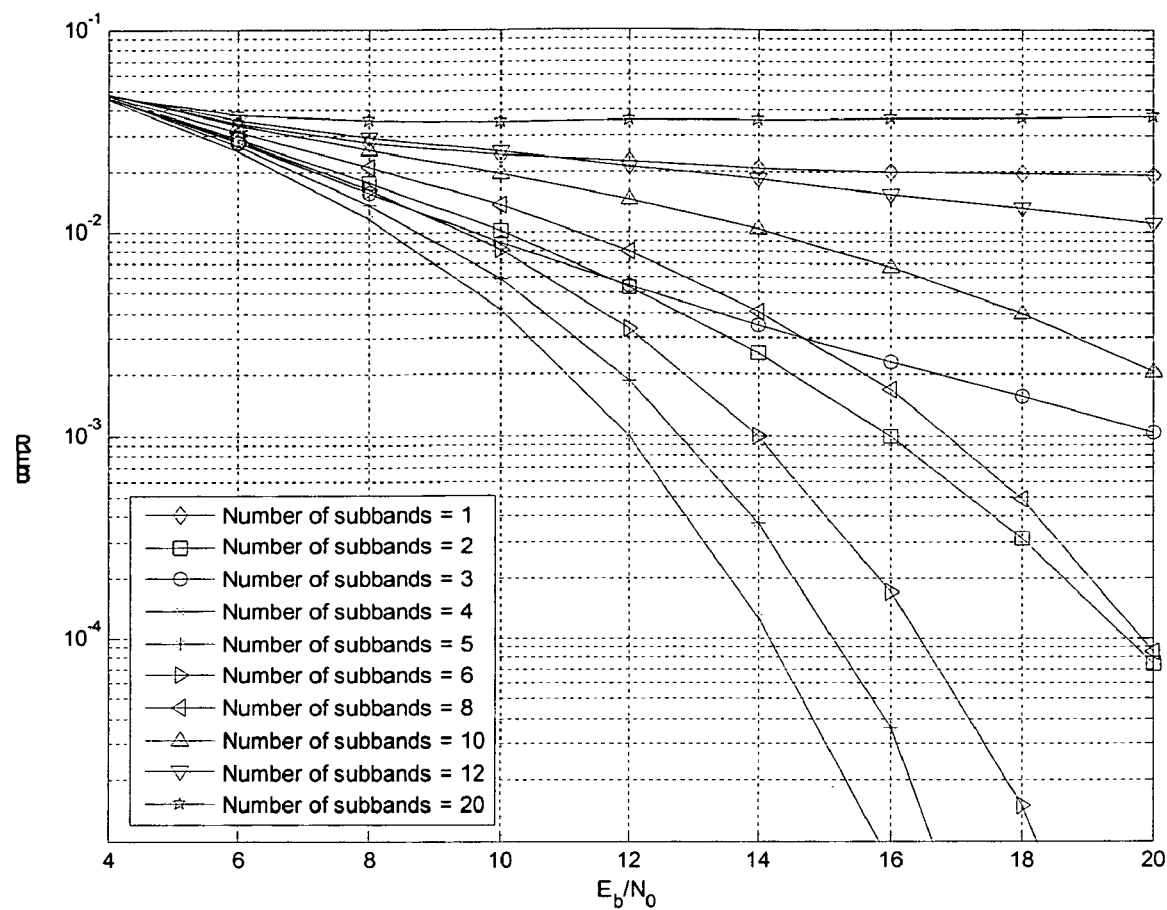
FIG. 8 is a graph of simulated BER performance under multi-tone jamming for multi-subband communication systems for varying number of subbands.

FIG. 8 shows the BER performance in multi-tone jamming as a function of the number Q of subbands used, with Q varying from 1 to 20. The total occupied signal bandwidth for the simulation results remains fixed at 5 MHz, such that each of the Q subbands has a bandwidth $w_Q$=5 MHz/Q. This ensures that the data rate of the system is approximately equal for all multi-subband systems tested. An important observed feature was that the BER improvement is not a monotonic function of the number of subbands Q, but there is an optimum number Q of subbands where the BER is lowest, which for the simulated system embodiment was 4 subbands. The worsening of the BER performance when the subband number Q increases above the optimum can be explained as follows: for a given total emitter power, the power per subband is a function of the number of subbands used in transmission. Thus, as the number of subbands increases, the subband bandwidth and signal power per subband decreases, resulting in subband signals which are more sensitive to jamming waveforms when the hopping frequencies coincide with jammed regions of the spectrum. This means that an optimum number of subbands will exist, dependent on the jamming environment encountered. For the multi-tone jamming waveform set at SJR=−8 dB, FIG. 8 shows that the optimum number is four subbands each of 1.25 MHz bandwidth (4×1.25 MHz). Such an optimum Q was found to exist even when the hopping frequencies are adaptively selected to minimize jamming. Depending on a particular implementation and system requirements, the optimum Q is from 2 to 8 for most, although not necessarily all, systems according to the present invention. The optimum Q, however, is expected to rise, e.g., with increasing of the input bit rate.

The aforedescribed simulation results demonstrate that the adaptive frequency hopping multi-subband communication system and method described hereinabove in this specification efficiently utilize available transmission bandwidth, whilst providing robustness to jamming techniques. In the presence of PBN jamming, the multi-band scheme combined with forward error correction coding exhibits a diversity gain when compared to a single subband conventional transmission method, due to the signal interleaving over multiple parallel subbands. In the presence of MT jamming, the multi-subband signal is more robust to tone jamming than a single subband solution. For the simulated embodiments, an MT jammer must increase its power by a further 4 dB compared to the conventional system to induce irreducible errors and render the multi-subband communication inoperable. The multi-subband transmission scheme of the present invention requires no extra power or bandwidth to realize the performance gains described, compared to the conventional single subband solution. Additionally, there are no requirements for jammer information to be known in order to obtain performance benefits. If jammer information is available, the proposed system can make adaptive adjustments to improve performance further, for example, by careful choice of subband frequencies.

An embodiment of a frequency-hopping transmission system realizing a method of such adaptive avoidance of external interference signals according to the present invention will now be described.

In this embodiment, the transmission system of the present invention periodically, but not necessarily at equal time intervals, measures a spectral energy, or a power spectral density (PSD) of external RF signals interfering with the transmission, such as jamming signals, over the entire span of the transmission band and categorizes portions of the entire transmission spectrum by RF energy content, thereby identifying spectral areas with low jammer and/or other interference energy. A probabilistic spectrum utilization is then used to define spectral regions in which the frequency-hopping multi-subband system operates. To that end, a coarse spectral distribution of the external RF signals is determined from the measured spectral energy over the transmission band, and then used to enable the system to stochastically adapt to the dynamic jamming and interference environment using a weighted pseudo-random selection of frequency ranges for hopping.

The method enables high data rate frequency-hopping transmission systems to adaptively utilize available spectrum in the presence of the interfering RF signals without requiring a-priori knowledge of the spectral occupancy, spectral allocations or the jammer activity. Simulation results have shown that the system of the present invention incorporating spectrum measurement and adaptive frequency hopping combined with multi-band transmission exhibits relatively large gains compared to schemes employing multi-band transmission without the adaptive spectrum utilization, and even larger gain when compared to a single carrier transmission scheme without the adaptive spectrum utilization.

The following terminology is used hereinafter in the description. The words "operating band" are used to mean an entire region of the spectrum in which the wireless system can operate; this operating band, i.e. a plurality of all possible operating frequencies, will be denoted hereinafter as $\Omega$. In the case of military UHF communications, for example, the operating band $\Omega$ can be a frequency range between 225 and 400 MHz. The words "external RF signals" in the context of this specification are used to mean any RF signal, or power, that can be present in the operating band $\Omega$ and can interfere with the transmission and detrimentally affect its quality, such as jamming signals, RF signals from other communication systems or other RF transmitters within the same communication system. In the presence of the external RF signals, only a subset of the operating band can be deemed as free and thus chosen to be used at any one time. A subset of the operating band $\Omega$ that is deemed to be relatively free from the external RF signals and therefore selected for the transmission is termed as the "available hopping frequencies". This subset has also been referred to hereinabove as the frequency hopping range $\{f\}_q$, and in the case of the multi-subband frequency hopping can, within the scope of the invention, differ from subband to subband; for the embodiment now described the frequency hopping range is preferably the same for all subbands, and is denoted as B.

The frequency hopping range B, a.k.a. the available hopping frequencies, may consist of a set of non-contiguous frequency ranges. An example of such non-contiguous frequency hopping range is the frequency range $B=B_1 \cup B_2$ shown in FIG. 2. Once the frequency hopping range B is chosen, the frequency-hopping sequences are selected from the set of available hopping frequencies, i.e. from the selected frequency hopping range B using e.g. a pseudo-random algorithm known to both the receiver and the transmitter. In the multi-subband FH scheme of the present invention described herinabove, there are several orthogonal frequency hop sequences, and preferably an equal number of hop frequencies used concurrently by the system at any time, all of which lie within the set of available hopping frequencies. To generate a frequency hopping sequence, a non-contiguous frequency hopping range may first be mapped onto a pre-defined contiguous frequency band, within which one or more frequency hopping sequences are generated, and then mapped back onto the available hopping frequencies.

Advantageously, the frequency hopping range in the method of the present invention is determined dynamically and adaptively to a power distribution of the interference RF signal across the operating band. The periodic measurement of the PSD function of the external RF interfering signal within the operating band enables the system to assess the occupancy distribution of the operating band by jamming or other interference. The power, or energy, measurements are the basis on which the adaptive system dynamically selects the available hopping frequencies. Preferably, the process of hopping range selection is randomized to make it more difficult for the jammer to predict where in the operating band the communications will occur. If the interference-free regions vary in time, consecutive RF power measurements yield a changing PSD function, and therefore an adaptively changing set of available hopping frequencies. In effect, the frequency-hopping communication system is directed to adaptively hop into relatively interference-free regions of the operating band.

In an exemplary embodiment of the method, the spectral power measurement of the external, interfering RF signals is used to create an estimate of the RF power density over the operating band. A simple but effective measurement scheme is to divide the operating band into a plurality of RF frequency regions {R}, which are also referred to hereinafter as the "measurement regions"; the plurality of all measurement regions define a coarse grid for the PSD function. Once the RF frequency regions have been established, adaptation of the frequency hopping waveform is achieved in four stages:

(i) a periodic PSD measurement over the span of the operating band $\Omega$ is performed, and used to determine an RF energy parameter for each of the regions R, the plurality of all RF energy parameters for the plurality measurement regions {R} defining a spectral distribution function of the external RF signal, also referred to herein as the "coarse" PSD function;

(ii) all measured regions of the operating band are categorized (i.e. ranked) by power content, thereby identifying spectral areas with low jammer and other interference power;

(iii) probability density function (PDF) governing the utilization of the available spectrum is defined; and (iv) based on the PDF, a number of preferred regions from the plurality of RF frequency regions {R} are chosen in which to operate, the preferred regions together forming the frequency hopping range B. The pseudorandom hopping frequencies are then generated based on the preferred regions of the spectrum.

Selection Algorithm for RF Frequency Regions

Figure 9:
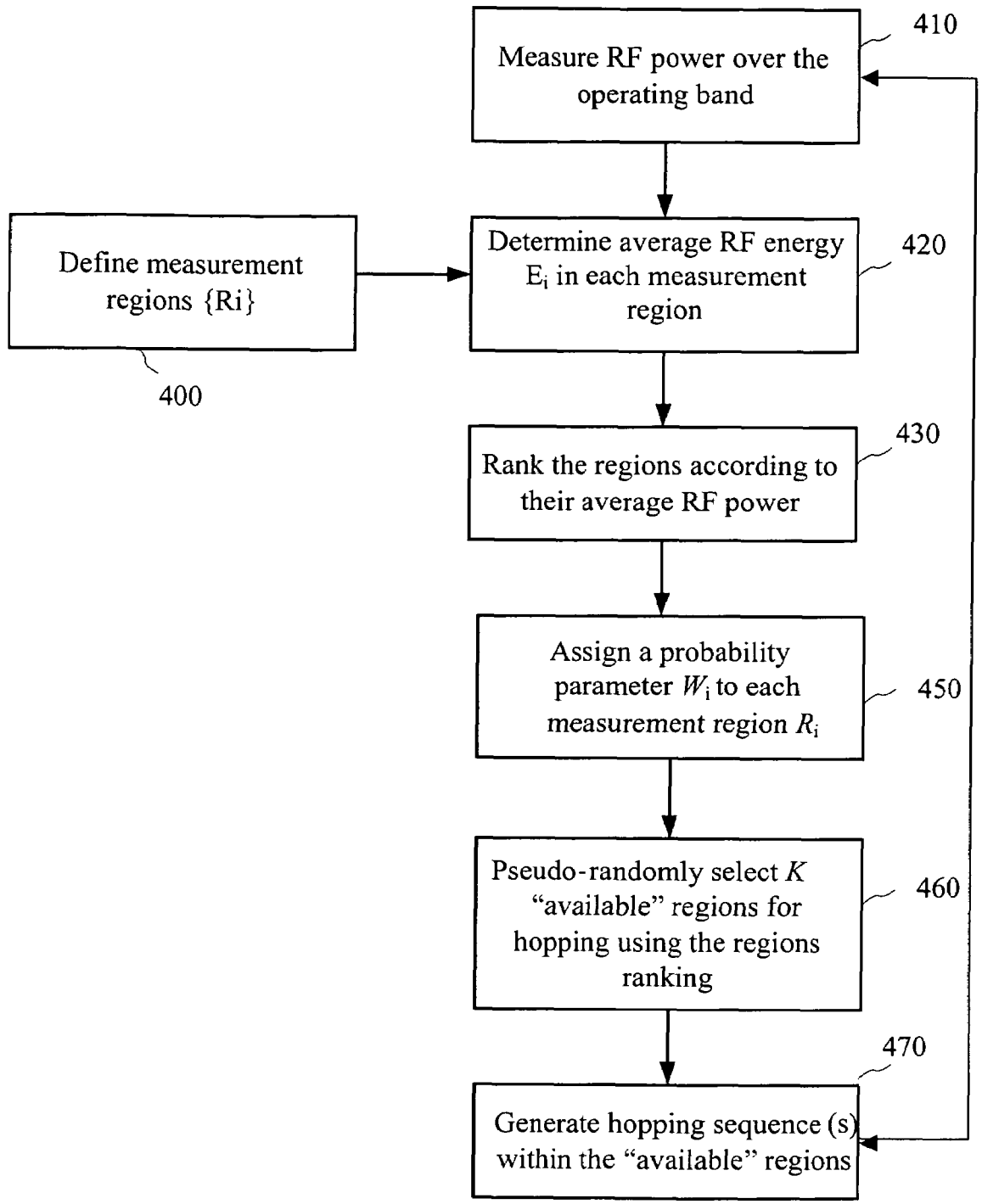
FIG. 9 is a flowchart showing method steps of adaptive selection of frequency hopping sequences according to the present invention.

One embodiment of the method of the present invention of dynamically changing frequency hopping parameters to adapt to changing transmission environment is illustrated in FIG. 9, and includes the following steps:

Initially, in a step 400 the allocated operating band $\Omega = [f_0, f_N]$ is divided into N RF frequency regions, also referred to herein as measurement regions, $R_i$, i=0 ... N−1, where $R_i = [f_i, f_{i+1}]$, i=0, ..., N−2 and $R_{N-1} = [f_{N-1}, f_N]$. The total operating band is then $$\Omega = R_0 \cup \ldots \cup R_{N-1}. \tag{11}$$

Once the measurement regions are defined, an RF energy $E_i$ within each region $R_i$ from the plurality of frequency regions $\{R_0, \ldots, R_{N-1}\} = \{R\}N$ is determined using RF power measurements. These measurements are preferably performed periodically during the system operation to detect changes in the distribution of the external RF power across the operating band in time; accordingly, a subscript index "n" will be used hereinafter to indicate values obtained as a result of an n-th consecutive RF power measurement taken at a time moment $t_n$, so that the RF energy $E_i$ within i-th frequency region $R_i$ obtain by n-th RF power measurement is denoted $E_{i,n}$. In a preferred embodiment, first an actual measurement of the external RF power is performed in a step 410 on a frequency grid that is finer than the grid defined by the measurement regions $R_i$, and then the higher-resolution PSD measurements so obtained are aggregated in step 420 to determine the RF energy $E_{i,n}$ within each region $R_i$:

$$E_{i,n} = \sum_{k=1}^{N_{fb}} S_n(iN_{fb} + k), \quad i = 0, \ldots N - 1, \tag{12}$$

where $N_{fb}$ is the number of frequency bins within the region $R_i$ used in the original PSD measurement, $S_n(k)$ is the n-th original RF power, or energy, value measured for a k-th frequency bin. Note that $N_{fb}$ can be region-dependent, and in that case the right hand side of equation (12) should be normalized, e.g. by a number of measurement points in the corresponding measurement range, given a value that is proportional to the average power, or average energy of the external RF signal in the corresponding RF frequency range $R_i$. The parameter $E_{i,n}$ is therefore preferably proportional to an average value of the RF energy measured within the RF frequency region $R_i$ at a time instance $t_n$, and will also be referred to hereinafter as the RF energy parameter of said region $R_i$. The plurality of all N energy parameters $\{R_{i=0,n}, \ldots, R_{i=N-1,n}\} = \{R\}_{N,n}$ can be considered as defining the coarse PSD distribution of the external RF signals over the operating band $\Omega$. In the following, the time index "n" will be omitted when values obtained at any one particular measurement time instance $t_n$ are discussed, and when it doesn't cause a confusion.

Those skilled in the art will appreciate that various RF power measurement and data processing techniques can be employed for determining the RF energy parameters $E_i$. For example, the process of obtaining these parameters using RF measurements may involve analogue or digital filtering of measured RF power data within the operating band and sampling thereof using analog-to-digital conversion. The signal processing part may involve FFT-based algorithms to determine the energy parameters $E_i$ from time-sampled measured data in the required bandwidths, i.e. $[f_i, f_{i+1}]$. Alternatively, a spectral distribution of the external RF signal can be measured directly using hardware filters and/or sweep frequency synthesizers. The measurements of $E_i$ can be also made directly using a bank of analog power detectors tuned to the regions $R_i$, with the resulting data time sampled every PSD update interval. Preferably, a chosen measurement technique, or a chosen combination of a measurement and data-processing techniques has a frequency resolution $\delta f$ that is smaller than a spectral width $\Delta f = (f_i - f_{i-1})$ of one spectral region $R_i$, so to enable re-defining the measurement regions $R_i$ to adapt to a changing transmission environment or bandwidth requirements. Hereafter in this specification, an RF energy measurement that provides the RF energy parameters $E_i$ for respective RF frequency regions $R_i$, either by itself or in combination with suitable data processing techniques is referred to as the spectrally-resolved RF measurement.

In a next general step, a probability value $W_{i,n}$ is assigned to each measurement region $R_i$ based on the above determined plurality of energy parameters $\{E_{i,n}\}$, i=0, ..., N−1, of the measurement regions $R_i$; these probability values are then used in following steps as relative weightings for the respective RF frequency regions in a pseudo-random selection of a suitable sub-set of usable RF frequency regions for hopping:

$$W_{i,n} = q(E_{1,n}, \ldots, E_{N-1,n}), i=1, \ldots, N-1 \tag{14},$$

where function q(●) is a design choice and depends on a particular implementation of the method. For example, the function q(●) could be a weighted normalization of the RF energy $E_i$ within a corresponding RF frequency range $R_i$ to a total RF energy within the operating band, i.e. equation (14) in this case can be of the following form:

$$W_{i,n} = \frac{\alpha_i E_{i,n}}{\sum_{j=1}^{N-1} \beta_j E_{j,n}} \qquad (15)$$

where $\alpha_i$ and $\beta_j$ are real constants.

In the exemplary embodiment described herein, the step of assigning the probability values to the RF frequency ranges is performed in two steps:

First, in step 430, each of the regions $R_i$ is assigned a rank $\Gamma_{i,n}$ according to the RF spectral power contained within each region at the time of an n-th measurement, i.e. according to their $E_i$ parameters, so that $$\Gamma_{i,n} = r_i(E_{0,n}, \ldots, E_{N-1,n}) \qquad (16)$$

where $r_i(\ )$ is a function or an algorithm that ranks each of the spectral regions $R_i$ within the plurality of spectral regions $\{R_i\}$, i=0, ..., N−1 and n denotes the time instant $t_n$ at which the RF power measurement was taken. In one embodiment, the function $r_i(\ )$ is a simple ranking algorithm wherein the energy parameters $E_i$ of the regions $R_i$ are sorted in ascending order, and the frequency regions $R_i$ are assigned integer ranks according to the positions of their respective energy parameters in the order, so that if e.g. a j'th frequency region has the smallest average RF energy, i.e. $E_j \leq E_i$ for all i satisfying $0 \leq i \leq N-1$, the region $R_j$ is assigned a rank $\Gamma_j = 1$; a region with the next smallest RF energy $E_l$, $E_l \leq E_i$ for all i≠j, is assigned a rank $\Gamma_l = 2$, etc. In other embodiments, other ranking algorithms can be used, which generally rank regions $R_i$ according to their RF energy content $E_i$ relative to the other RF frequency regions within the operating band Ω. In some embodiments, measurement regions with the RF energy parameter exceeding a pre-determined threshold can be assigned a rank that effectively eliminates them from the selection process, e.g. an infinity or a number that is large enough so that the associated probability value is effectively zero.

The probability values $W_{i,n}$ are computed in a next step 450 for the frequency regions $R_i$ based on their ranking:

$$W_{i,n} = g_i(\Gamma_{0,n}, \ldots, \Gamma_{N-1,n}) \qquad (17)$$

where i=0, ..., N−1, and n denotes a time instant $t_n$ at which the RF power measurement was taken.

The functions $g_i(\ )$ can be chosen depending on application requirements and the deployment scenario; the choice of a particular $g_i(\ )$ can be used to control how closely the subset of regions $R_i$ selected by the algorithm corresponds to the actual least-jammed regions, or, alternatively, how much randomness in the selection process is allowed. In some embodiments, the functions $g_i(\Gamma_{0,n}, \ldots, \Gamma_{N-1,n})$ can be chosen to depend only on the rank $\Gamma_{i,n}$ of the respective i-th measurement region, i.e. $g_i(\Gamma_{0,n}, \ldots, \Gamma_{N-1,n}) = g_i(\Gamma_{i,n})$. Examples of these functions include an exponent $g_i(\Gamma_{i,n}) = \exp(m - \Gamma_{i,n})$, where m is a normalization parameter, e.g. m=1, and a uniform distribution $g_i(\Gamma_{i,n}) = 1/\Gamma_{i,n}$.

Once each of the regions $R_i$ is assigned its respective probability value $W_{i,n}$, in a next step 460 a subset $\{R\}_{K,n} = \{R_{i_1}, \ldots, R_{i_K}\}$ of K≤N "preferred", or "available", regions is selected from the plurality $\{R\}_N$ of the N measurement regions. This selection is preferably performed using a pseudo-random selection algorithm such that an i-th region is selected with probability $W_{i,n}$ for i=1, ..., N−1. The number K of preferred regions is a parameter that can be either pre-defined, or dynamically selected in dependence on the transmission environment, bandwidth requirements etc. The subset $\{R\}_{K,n}$ of so selected regions together form the plurality of "available hopping frequencies", a.k.a. the hopping range B, from where the hopping sequences $f_q$, with q being the sub-band index, are generated in a next step 470 using a pre-defined, preferably pseudo-random selection mechanism known to both the receiver and the transmitter. After a time interval ($t_{n+1} - t_n$), which can be either pre-defined or dynamically determined, the process steps 410-470 are repeated, and the frequency hopping spectrum is changed as required to adapt to a changing transmission interference environment.

Advantageously, the hopping frequency selection in the method of the present invention is not deterministic; using the pseudo-random selection algorithm described hereinabove, wherein each measurement region $R_i$ is assigned a probability $W_i$ reflecting its relative occupation by the interfering RF signals and hence its relative availability, enables the FH system of the present invention to adapt pseudo-randomly to the dynamic jamming and interference environment in a way that cannot be predicted by an interceptor, making it difficult for such an interceptor or an adaptive jammer to anticipate the spectral utilization of the FH system. As the jamming or interference environment changes, the power spectral density estimation and consequently the probability values are updated. Using regular RF power measurements across the operating band, the FH system is directed to hop into relatively interference-free regions of the operating band adaptively, providing the update period of the PSD measurement is equal to or greater than the response time of the jamming or interference signals. It is anticipated that in a multiple-user configuration, the random access feature provided by the adaptive frequency selection algorithm of the present invention will enable users to operate with only limited coordination. When interference arises from other legitimate users instead of jamming, the adaptive hopping range selection technique can be used for random frequency selection so that mutual multi-user interference is reduced.

Note that no a-priori external channel information is required for the operation of the aforedescribed method of adaptive interference avoiding. That is, no intelligence of jammer algorithms, or prior knowledge of legitimate frequency allocations and use are required, as the system obtains estimates of the channel PSD using its own periodic RF power measurements. Note also that conventional FH transceivers include frequency-selective receivers that are tunable over the operating band, and therefore may not require any significant extra hardware components to implement the PSD measurements according to the adaptive method of the present invention as described hereinabove, e.g. with reference to FIG. 9, but may require additional control and/or data processing circuitry, or equivalent software instructions, to implement the spectrum scanning, storing and processing of the PSD distributions and PDFs, and the hopping range adjustments.

Figure 10:
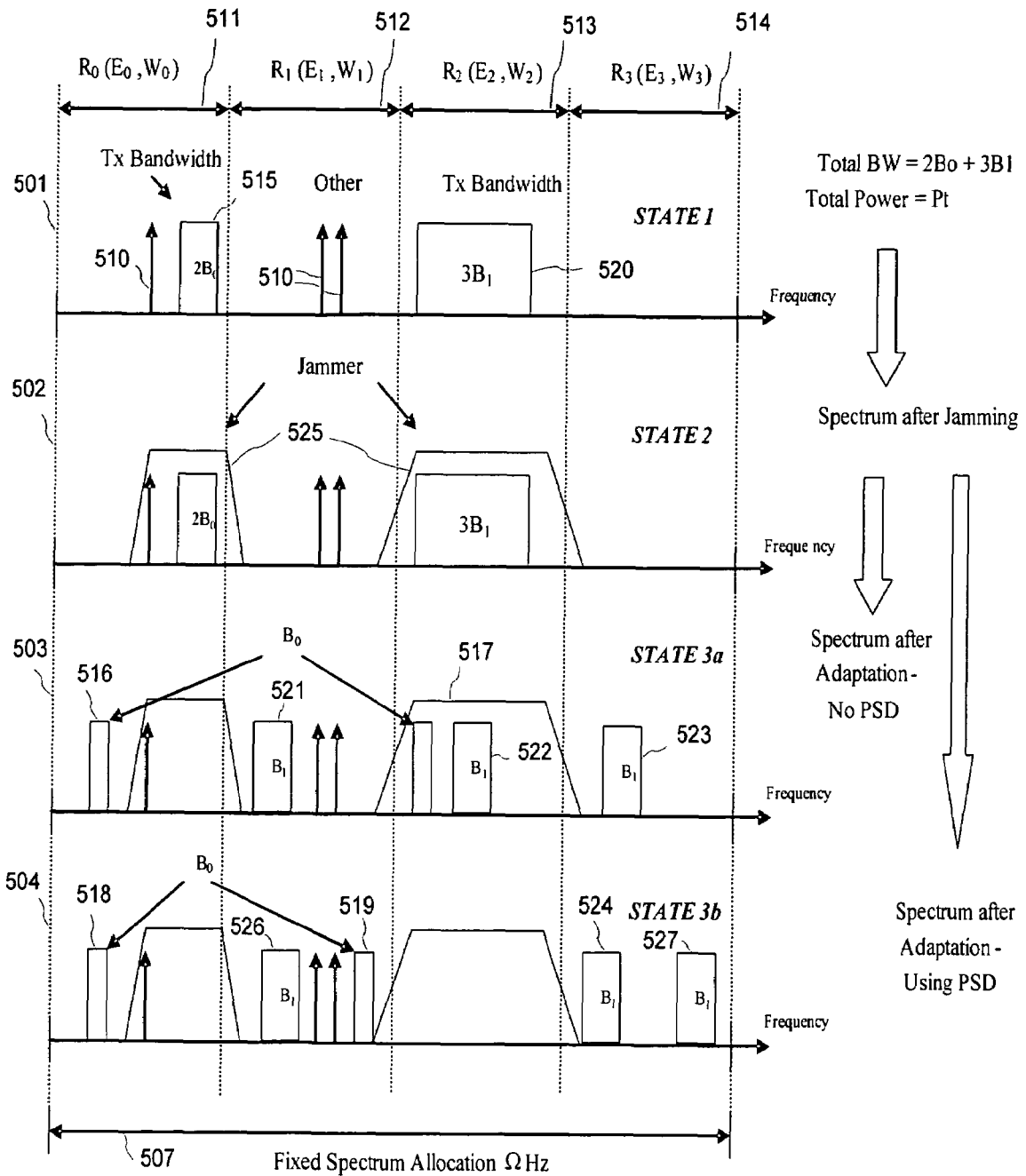
FIG. 10 is a schematic diagram illustrating adaptation of the multi-subband frequency-hopping transmission system with and without RF spectral power measurements.

By way of example, FIG. 10 illustrates how the frequency-hopping transmission system adapts to the jamming with and without the periodic PSD measurements of the external RF signals and the adaptive avoiding thereof. In this example, the transmission system is the multi-subband FH system of the present invention, which has the operating band with a fixed total allocation of Ω, as schematically shown by a double arrow 507, and a fixed total transmit power $P_t$. The RF frequency regions allocated for PSD measurements are the regions $R_0, R_1, R_2, R_3$ schematically shown with arrows 511-

514, and the transmitted communications waveform has a pre-defined total bandwidth of ($2B_0+3B_1$). Vertical arrows 510 symbolize fixed frequency allocations for other users that may be found within the operating band $\Omega$. Initially, the frequency hopping range is the whole allocated frequency band $\Omega$, i.e. $B=R_0 \cup R_1 \cup R_2 \cup R_3$. Row 501 shows the spectrum occupancy in the band $\Omega$ in a state 1, corresponding to a particular frequency hop state of the transmission system.

For a given hop, the communication signal is transmitted in two separate contiguous blocks, or subbands, 515, 520 with bandwidths ($2B_0$) and ($3B_1$), respectively. A second row 502 illustrates State 2 of the transmission wherein a jamming signal 525 is applied across the two bands 515, 520 of the transmitted signal. This results in an increase in the error rate at the receiver, corresponding to an increase in the transmit power of the jammer. State 3a, row 503, illustrates a possible response of the multi-subband FH system of the present invention to the jamming signal 525, when the multi-subband transmitter uses the remote receiver feedback signal F, rather than the spectrally-resolved RF power measurements, to adapt the transmission to the changed environment; the receiver feedback signal F can provide, for example, a sub-band-level channel quality characteristics, e.g. the SINR or the error rate estimate per subband per hop interval $R_{err}(q,m)$, which is generated by the receiver channel estimation unit 230 as described hereinabove with reference to FIG. 3. In this case, the available hopping frequencies are not adaptively selected from the regions $R_0$, $R_1$, $R_2$, $R_3$ on the basis of spectrally-resolved RF power measurements; instead the existing transmitted bandwidth is split into several parallel subbands 516, 521, 517, 522, 523, and may utilise parts of the spectrum that do not contain the jamming signal, as e.g. the subbands 516, 521 and 523, although it is not guaranteed that the subbands are placed at frequencies free of jamming, as illustrated by the subbands 517, 522. Indeed, as was described hereinabove with reference to FIG. 3, the multi-subband FH transmission system that adaptively changes its transmission parameters in response to the receiver "channel quality" feedback alone, can be to split the broadband subbands with bandwidths $2B_0$ and $3B_1$ into several narrower subbands, and to randomly place them across the operating band, aiming at decreasing the spectral signal/jamming overlap improving the error rate performance of the system.

However, if the adaptive system has knowledge of the RF power distribution across the operating band, and therefore at least a coarse indication of the jammer and/or interferer power distribution, a further improvement in the receiver error rate can be achieved. State 3b, row 504, illustrates a possible response of the transmission system that uses the method of the active jamming avoiding of the present invention, e.g. as described hereinabove with reference to FIG. 9. In this case, the hopping frequency range B is adaptively adjusted after an estimate of the PSD of the operating band is obtained. In the particular example illustrated in FIG. 10, row 504, the spectral distribution of the external RF signals is determined by measuring the RF power of the signals 525, 510 over the operating frequency band $\Omega$ for obtaining the measured PSD distribution, dividing the entire spectrum into the four measurement regions $\{R_0, R_1, R_2 \text{ and } R_3\}$, determining, for each of the plurality of RF frequency regions $\{R_0, R_1, R_2 \text{ and } R_3\}$ a measured energy parameter $\{E_0, E_1, E_2 \text{ and } E_3\}$ and assigning to the regions weighting factors, or probability values, $\{W_0, W_1, W_2 \text{ and } W_3\}$. In the example illustrated in FIG. 10, we sort the regions according to increasing jamming and interference energy, thereby obtaining an ordered region sequence $\{R_3, R_1, R_0 \text{ and } R_2\}$, with $R_2$ containing the greatest amount of wideband jamming and $R_3$ containing almost no jamming. Therefore, $R_3$ is assigned a higher probability value for use by the multi-subband FH system, and $R_2$ is assigned a lower probability. By way of example, the adaptation method selects the regions $\{R_0, R_1, R_3\}$ as the set of available hopping frequencies together forming the hopping range B. The multi-subband FH system then adapts to the jammer and/or interference, by splitting the transmission bands 515, 520 into 5 parallel subbands 518, 526, 519, 524, and 527, which are hopping within the regions $\{R_0, R_1, R_3\}$, with the region $R_2$ excluded from the hopping range B. Since the transmission frequencies do not hop into the region $R_2$, an improvement in the error rate is achieved as compared to the approach where the PSD is not measured and all regions $\{R_0, R_1, R_2 \text{ and } R_3\}$ are used for hopping, see row 503, state 3a.

Those skilled in the art will appreciate that the spectrum measurement based method of active avoiding of the external RF signals of the present invention by spectrum adaptation, e.g. as illustrated in FIG. 9, is not limited to multi-subband FH systems, but can be beneficially used in more conventional single-subband FH transmission systems to allocate spectrum for the communications signals, e.g. using information obtained by the aforedescribed coarse PSD estimation technique in conjunction with the weighted probability approach to the frequency hopping range selection.

Figure 11:
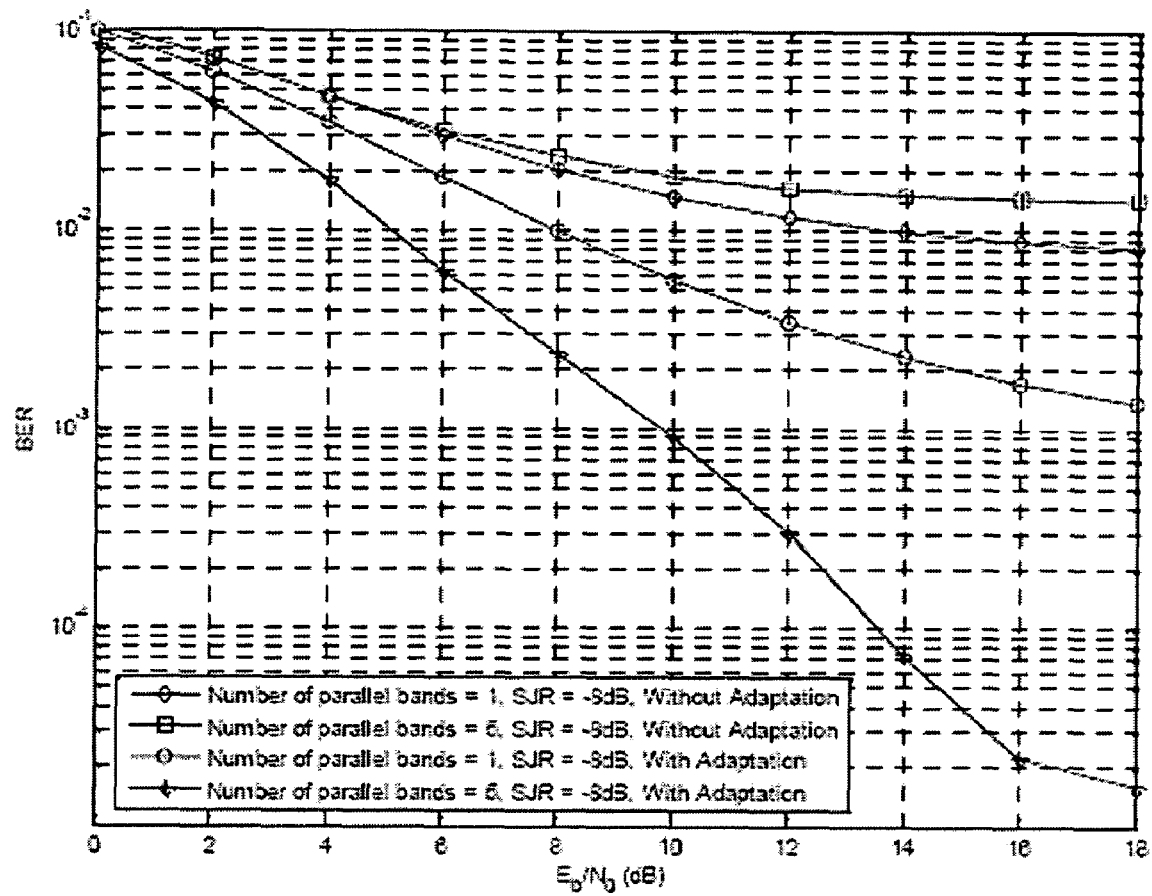
FIG. 11 is a graph of uncoded BER performance of the FH multi-subband transmission scheme with and without the RF power-based adaptation of the frequency hopping range.
Figure 12:
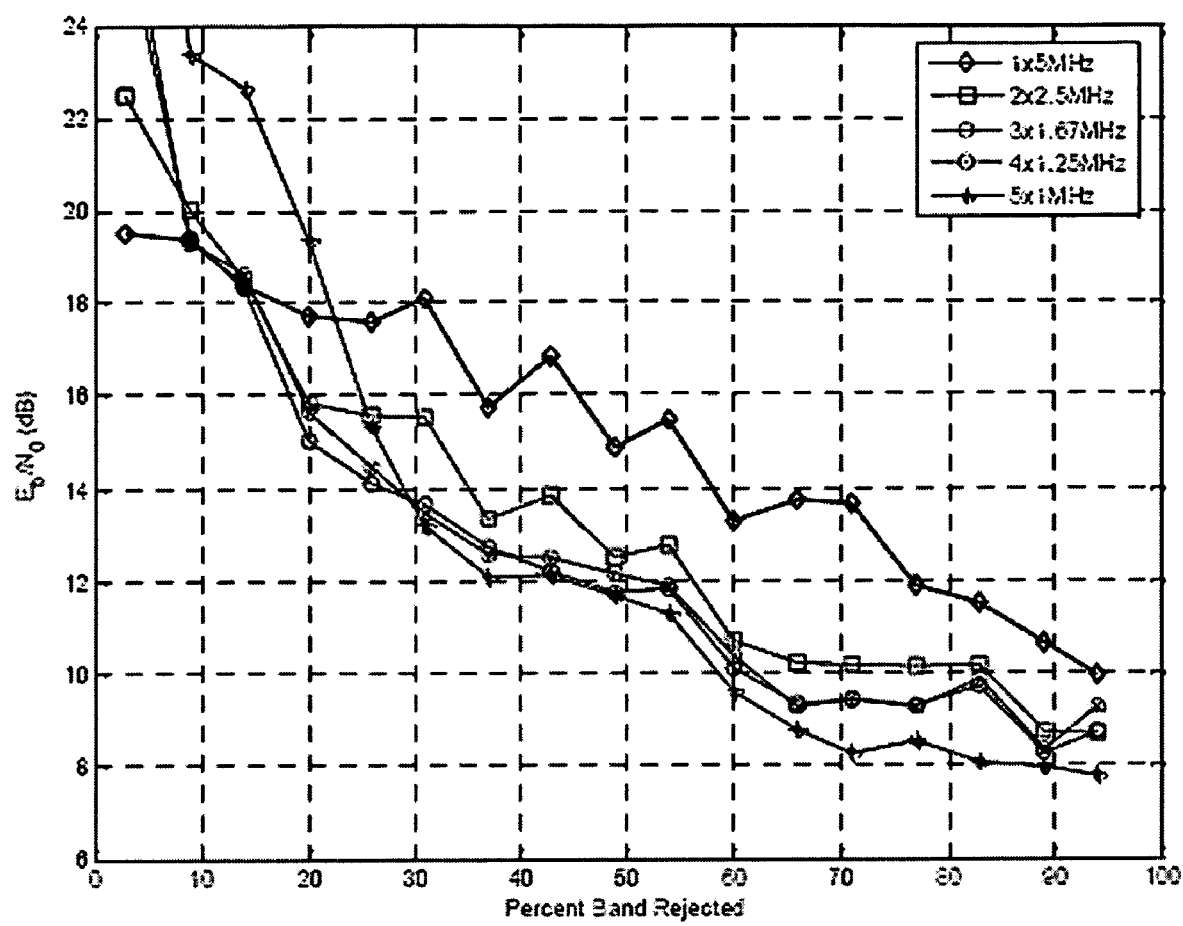
FIG. 12 is a graph showing the SINR required to achieve an uncoded bit error rate of $10^{-3}$ as a function of a rejected fraction of the operating band.

Our simulations demonstrated that significant gains of system performance and robustness to jamming and interference can indeed be provided by the aforedescribed method of hopping spectrum adaptation. By way of example, FIGS. 11 and 12 show simulation results comparing the transmission system performance with and without the hopping spectrum adaptation in the presence of the multi-tone jamming for single-subband and multi-subband channels, each with a total bandwidth of 5 MHz; the jamming and system parameters used in the simulations were as described hereinabove with reference to FIGS. 6 and 7. FIG. 11 shows BER performance of the single-subband channel denoted "1×5 MHz", and the 5-subband channel denoted "5×1 MHz", for SJR=−8 dB with and without using the method of adaptive spectrum adaptation as shown in FIG. 9. The results show in FIG. 11 demonstrate that without the spectrum adaptation, both the single 5 MHz frequency-hopped channel and the multi-subband 5×1 MHz channel exhibit an error floor. In fact, without the hopping spectrum adaptation an error floor will appear irrespective of the number of parallel subbands used, as there is no constraint in place to stop the transmitter from selecting hopping frequencies overlapping with jamming or interference tones. In contrast, when the spectrum adaptation algorithm is enabled, a considerable gain in BER performance is obtained for both the multi-subband and single-subband systems, with the multi-band FH channel gaining additionally approximately 3 dB of the SINR $E_b/N_0$ at an error rate of $10^{-2}$, and approximately 110 dB for an error rate $10^{-3}$ compared to the single carrier FH channel. The relatively poorer performance of the single carrier FH system can be attributed to the fact that the operating band has a relatively large number of high power jamming tones present, and thus there are relatively few contiguous 5 MHz bands free of jamming in which the single carrier scheme can hop. In contrast, when using a 5×1 MHz waveform, the error floor is lowered to a level that can be corrected with coding, as there is now a relatively large number of 1 MHz jammer-free regions in which the waveform can hop.

FIG. 12 shows the SINR gain that is attainable by the power measurements-assisted spectrum adaptation method versus a pre-determined percentage of the operating band rejection for various subband configurations, i.e. for channels transmitting the signal of 5 MHz total bandwidth and the same total power in one to five subbands using the QPSK modulation format. Again, the method of the present invention of the spectrum adaptation using the RF power measurement provides considerable improvement for both the single-subband 1×5 MHz transmission and the multi-subband transmissions, with the shown multi-subband schemes all providing better SINR once approximately 20% of the operating band is rejected, i.e. if the hopping range B is about 80% or less in width than the operating band $\Omega$, which in this case was assumed to have a 175 MHz bandwidth. Furthermore, transmission with five parallel subbands of 1 MHz bandwidth each, denoted "5×1 MHz", yields a gain of approximately 6 dB as compared to the single carrier scheme denoted "1×5 MHz" at the 70% band rejection point. The resolution bandwidth of the coarse PSD estimation used in obtaining the simulation results shown in FIGS. 11 and 12 was set at 1 MHz over the 175 MHz operating band, which corresponds to defining N =175 measurement RF regions $R_i$ of 1 MHz each.

Figure 13:
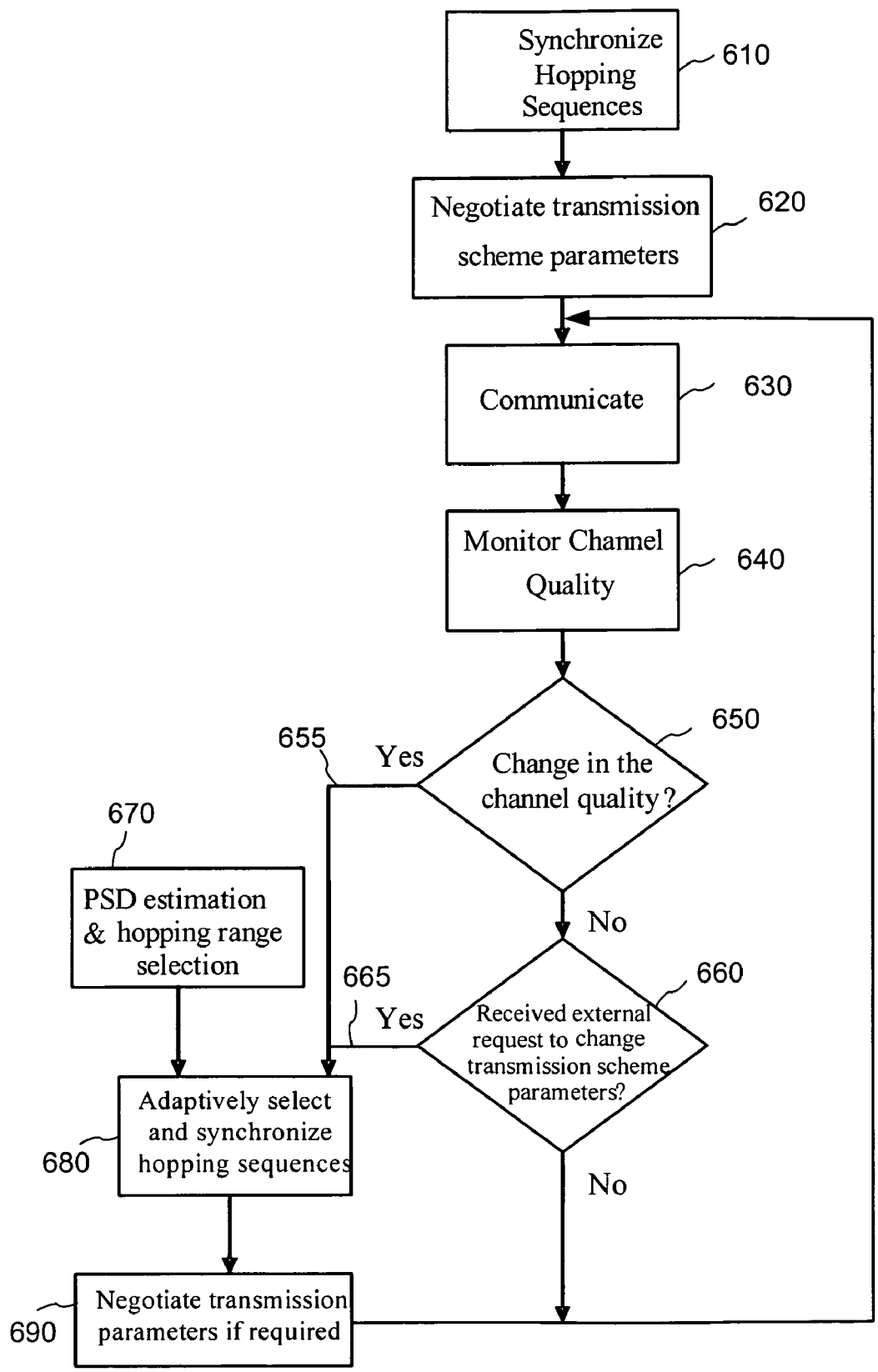
FIG. 13 is a flowchart of the method of adaptive avoidance of high-interference frequency ranges in an adaptive frequency hopping system according to the present invention.

In some system embodiments, the PSD measurement-based method of active avoiding of the external RF signals of the present invention by hopping spectrum adaptation can be used in combination with the channel quality information, which is extracted at the receiver, e.g. by the channel estimation unit 230 at each frequency hop and, preferably at the per-subband basis. FIG. 13 schematically illustrates one embodiment of such method of operating the adaptive FH transmission system of the present invention, wherein different block may simultaneously represent various steps of the method and hardware and/or software units implementing respective steps. In this embodiment, the communication system may include the multi-subband transmitter 10 and the multi-subband receiver 20 described hereinabove with reference to FIGS. 1 and 3, remotely communicating with each other via a radio communication link. Alternatively, the communication system may be a more conventional single-subband FH communication system, which however includes a PSD estimation unit 670 for estimating the coarse PSD function, and for adaptively selecting the frequency hopping range as described hereinabove. Once the system is turned on and a communication link between the transmitter and receiver is established, in a first step 610 the subband hopping sequences $f_q$ are synchronized in time between the transmitter and the receiver. In this first step, the hopping sequences $f_q$ are selected, e.g. using a pseudo-random algorithm known to both the receiver and transmitter, based on a full set of N pre-defined RF frequency regions $R_i$, so that initially the frequency hopping range $$B_{n=0} = \Omega = \bigcup_{i=0}^{N-1} R_i,$$

where n generally denotes consecutive time samples at which the PSD measurements of the external RF signals are taken, with n=0 in particular corresponding to the system initialization. In a next step 620, various transmission parameters can be negotiated between the transmitter and the receiver, such as the number of subbands, modulation format, data rate, coding scheme, and probability functions $g_i(\ )$.

In parallel to the initialization steps 610, 620, in step 670 the system performs an initial spectrally-resolved RF power measurement to detect the distribution of the external RF signals within the operating band, and if required adaptively and pseudo-randomly selects a new hopping range $B_{n=1}$ as a sub-set of the full set $\{R_i\}N$ of the measurement regions $R_i$ to avoid the external RF interference, e.g. using the steps shown in FIG. 9. In some embodiments, e.g. wherein the external RF signals are known to be present about equally at the receiver and the transmitter and/or there are several spatially dispersed receivers for receiving the signal from the same transmitter, the PSD measurements are performed at the transmitter, and the new set of the available frequencies wherein the hopping frequencies will be defined is communicated to the receiver. Advantageously, this can be done in a short few-bit message, e.g. comprising integer region identifiers for the selected RF frequency regions, i.e. their indices i, which requires very little bandwidth. In other embodiments, the PSD measurements are performed at the receiver. Once a new hopping frequency range is selected, new hopping sequences can be chosen therein and time-synchronized between the transmitter and the receiver in a next step 680, and the transmission parameters are re-negotiated in step 690.

After performing the system initialization steps 610, 620 and, optionally, 690, the communication system is in a normal operation mode, in which the transmitter transmits information to the receiver as required using the synchronized hopping frequencies and negotiated transmission parameters, while the receiver continuously estimates the transmission quality for each subband as it hops across the hopping range $B_n$, and monitors for changes in said quality, as schematically shown in FIG. 13 by blocks 630, 640, and 650. If the transmission quality drops below a pre-defined level, the receiver initiates a change in one or more of the transmission parameters, as shown by an arrow 655. Optionally, a request to change the transmission parameters, such as the coding rate and modulation format, can come externally, e.g. from the medium access control (MAC) layer of the transmission system, as schematically shown by an arrow 665 in FIG. 13.

During normal operation, the system periodically repeats step 670 of spectrally-resolved RF power measurements to detect change in occupancy of the operating band by external RF signals, and, when required, adapts the hopping range and hopping frequency sequences to changing transmission requirements. This adaptive spectrum adjustment, also referred herein as the transmission spectrum adaptation or the spectrum adaptation, can be initiated by the PSD estimation unit 670 itself, and/or by the signal 655 from the channel quality monitoring block 650 (channel estimator 230 in FIG. 3) when the transmission quality drops below a pre-determined level.

When the regions are ranked and selected as available hopping spectra, there is a probability, governed by the probability functions $g_i(\ )$, that the transmission scheme will select regions containing significant jamming and/or other interference power. Advantageously, this feature of the spectrum adaptation method of the present invention enables the system to avoid situations wherein an intelligent jammer effectively forces the adaptive transceiver into using a specific portion of the operating band by increasing the interference power across other parts of the spectrum. The performance degradation due to operating in a jammed band during some hop intervals is relatively small due to the lower probability of such hops as defined by the $g_i$ functions, and is recovered with error correction coding.

Thus, the adaptive identification of available hopping frequencies according to this aspect of the present invention has at least two advantages; first, it provides a method to adaptively reduce the effects of jammer and/or interference; and second, when combined with a multi-band transmission approach, it increases the resilience of the communication system to the jammer or other interference sources already present within the operating band.

Note that the adaptive scheme described hereinabove with reference to FIGS. 9 and 13 is aimed at allocating available hopping frequencies, and in it most general form does not limit other waveform or transmission parameters, such as modulation type, data rate, number of subbands, constellations, hopping sequence, code scheme, multiple access scheme, etc. It is, therefore, a general spectrum management method that can be combined with other adaptation rules governing a particular choice of the above-mentioned waveform parameters.

The present invention has been fully described in conjunction with the exemplary embodiments thereof with reference to the accompanying drawings. Of course numerous other embodiments may be envisioned without departing from the spirit and scope of the invention; it is to be understood that the various changes and modifications to the aforedescribed embodiments may be apparent to those skilled in the art. Such changes and modifications are to be understood as included within the scope of the present invention as defined by the appended claims, unless they depart therefrom.

We claim:

1. A method of transmitting an input data stream via a radio link, the input data stream having an input data rate, the method comprising the steps of:
   a) converting the input data stream into a plurality of parallel data sub-streams using serial-to-parallel conversion, wherein each of the parallel data sub-streams carries a different portion of the input data stream, each portion defining a sub-stream data rate;
   b) generating a carrier waveform having a hopping frequency for each parallel data sub-stream;
   c) modulating each carrier waveform using the respective parallel data sub-stream according to a modulation format to produce a frequency-hopping subband signal, said sub-band signal having a subband bandwidth related to the corresponding sub-stream data rate; and,
   d) forming a multi-subband frequency-hopping RF signal from the frequency-hopping subband signals for transmitting thereof via the radio link using an RF transmitting unit;
   wherein each of the frequency-hopping subband signals has a different frequency hopping sequence and a frequency hopping range, the frequency hopping ranges being such that at least two of the frequency hopping ranges have at least one common frequency, and wherein the subband bandwidths are individually adjustable in dependence upon at least one of:
   frequency bands available for the RF transmission and external signal interference in the radio link.

2. The method according to claim 1, wherein the frequency hopping sequences form a plurality of pseudo-random orthogonal hopping sequences.

3. The method according to claim 2, wherein step (a) comprises the step of encoding the input data stream using one of: forward error correction coding, cyclic redundancy check coding, and data symbol interleaving.

4. The method according to claim 2, wherein each data sub-stream comprises a sub-stream of symbols, each symbol having a size, and,
   wherein each of the sub-streams of symbols is formed from a different portion of the input stream of data.

5. The method according to claim 2, further comprising adding a pilot sequence of symbols to at least one of the data sub-streams.

6. The method according to claim 4, wherein at least one characteristics characteristic selected from the group consisting of:
   a number of the parallel data sub-streams,
   the frequency hopping range of at least one of the parallel data sub-streams,
   the symbol size for symbols in at least one of the parallel data sub-streams, and
   the modulation format for at least one of the parallel data sub-streams,
is adjustable in dependence upon one of: the input data rate, frequency bands available for
   the RF transmission, and external signal interference in the radio link.

7. The method according to claim 1, wherein at least two of the parallel data sub-streams have substantially a same frequency-hopping range.

8. The method according to claim 1 wherein at least one of the frequency-hopping ranges is non-contiguous.

9. The method according to claim 1 wherein step (a) comprises converting the input data stream into 2 to 8 parallel data sub-streams.

10. A method of receiving a stream of data transmitted by a transmitter using the method of claim 1, the method of receiving comprising the steps of:
    A) receiving the multi-subband frequency-hopping RF signal with an RF receiving unit, the multi-subband frequency-hopping RF signal comprising the plurality of frequency-hopping subband signals, each centered at a different hopping frequency known to the receiver;
    B) converting the multi-subband frequency-hopping RF signal into a plurality of baseband signals corresponding to the plurality of frequency-hopping subband signals;
    C) extracting a plurality of parallel sub-streams of received data symbols from the plurality of baseband signals, wherein each of the parallel sub-streams is extracted from a baseband signal corresponding to a different frequency-hopping subband signal; and,
    D) combining the extracted plurality of parallel sub-streams of received data symbols into a sequential stream of data symbols using a parallel-to-serial conversion.

11. The method according to claim 10, wherein step (C) includes producing a plurality of parallel sub-sequences of received data symbols by performing, for at least one of the baseband signals, the steps of:
    sampling the at least one of the baseband signals to obtain a sequence of received waveform samples;
    identifying a pilot sequence in the sequence of received waveform samples;
    performing subband-level channel estimation using the identified pilot sequence; and,
    performing subband-level channel equalizing upon the sequence of received waveform samples to obtain one of the plurality of parallel sub-streams of received data symbols.

12. The method according to claim 10, wherein step (D) comprises the steps of:
    combining the plurality of parallel sub-streams of the received data symbols into a combined sequence of data symbols using the parallel-to-serial conversion; and,
    de-coding the combined sequence of received data symbols to form the sequential stream of data symbols.

13. The method according to claim 10, further comprising the steps of:
    estimating a transmission quality characteristic for each of the received frequency-hopping subband signals, and forming a feedback signal for communicating to the transmitter for adaptively changing a characteristic of the multi-subband frequency-hopping RF signal at the transmitter.

14. The method according to claim 13, wherein the characteristic of the multi-subband frequency-hopping RF signal is one of:
   a number of the frequency-hopping subband signals in the multi-subband frequency-hopping RF signal,
   the frequency bandwidth of one of the frequency-hopping subband signals,
   the frequency hopping range of one of the frequency-hopping subband signal,
   the frequency hopping sequence of one of the frequency-hopping subband signal, and
   the modulation format for one of the frequency-hopping subband signal.

15. The method according to claim 1, further comprising adaptively determining at least one of the frequency hopping ranges from a spectral distribution of external RF signals for reducing signal interference in the radio link using the steps of:
   i) determining RF energy parameters indicative of the spectral distribution of the external RF signals for a plurality of RF frequency regions within an operating frequency band;
   ii) assigning a probability value to each of the plurality of RF frequency regions based on the RF energy parameters thereof; and,
   iii) generating a frequency hopping sequence based at least in part on the probability values for the plurality of the RF frequency regions.

16. The method according to claim 15, comprising measuring RF power of the external RF signals over the operating frequency band for obtaining a power spectral density distribution.

17. The method according to claim 15, wherein the external RF signals comprise jamming signals.

18. The method according to claim 16, wherein the RF energy parameters are obtained by averaging the power spectral density distribution over respective RF frequency regions.

19. The method according to claim 16, wherein the step of assigning a probability value to each of the plurality of RF frequency regions includes the step of ranking the RF frequency regions according to relative values of the respective energy parameters.

20. The method according to claim 16, further comprising the step of forming the at least one of the frequency hopping ranges by pseudo-randomly selecting one or more RF frequency regions from the plurality of the RF frequency regions based on the assigned probability values.

21. A multi-subband frequency-hopping transmitter for transmitting an input stream of data, comprising:
   an adaptive serial to parallel converter for adjustably converting the input data stream into a plurality of parallel data sub-streams, each of the parallel data sub-streams carrying a different adjustable portion of the input data stream;
   waveform generating means for generating a frequency-hopping carrier waveform for each of the parallel data sub-streams, each of the frequency-hopping carrier waveforms having a different hopping frequency;
   modulating means for modulating each of the frequency-hopping carrier waveforms with a corresponding data sub-stream using a modulation format to produce the frequency-hopping subband signals;
   an RF transmitting unit outputting the frequency-hopping subband signals for transmitting via a radio link to a receiver;
   wherein each of the frequency-hopping carrier waveforms has a distinct frequency hopping sequence and a frequency hopping range, the frequency hopping ranges being such that at least two of the frequency hopping ranges have at least one common frequency, and wherein the subband bandwidths are individually adjustable in dependence upon at least one of: frequency bands available for the RF transmission and external signal interference in the radio link.

22. The transmitter according to claim 21, further comprising means for inserting a pilot sequence of symbols in at least one of the plurality of parallel data sub-streams.

23. The transmitter according to claim 21, further comprising an encoder.

24. The transmitter according to claim 21, capable of adaptively changing at least one selected from the group consisting of:
   a number of subband signals;
   the portion of the input data stream carried by one of the parallel data sub-streams, the portion defining a data rate of said data sub-stream;
   the frequency-hopping range and the frequency-hopping sequence of one of the frequency-hopping subband signals; and,
   the modulation format of one of the frequency-hopping subband signals.

25. A multi-subband receiver for receiving a stream of data symbols transmitted using the transmitter of claim 21, comprising:
   an RF receiving unit for receiving a multi-subband RF signal comprising a plurality of frequency-hopping subband signals and for converting each of the plurality of frequency-hopping subband signals into a baseband signal;
   data extracting means for extracting a plurality of parallel sub-streams of received symbols from the plurality of baseband signals; and,
   output data conversion means for converting the plurality of parallel sub-streams of received symbols into a sequential stream of data symbols using a parallel-to-serial conversion.

26. The receiver according to claim 25, wherein the data extracting means comprises:
   an A/D converter for obtaining a sequence of received waveform samples from each of the baseband signals by sampling thereof;
   channel estimating means for identifying a pilot sequence in at least one of the sequences of received waveform samples, and for providing subband-level channel estimation based on the identified pilot sequence;
   channel equalizing means for performing subband-level channel equalization upon each of the sequences of received waveform samples based on the subband-level channel estimation provided by the channel estimating means to form the plurality of parallel sub-streams of received symbols.

27. The receiver according to claim 25, wherein the output data conversion means comprises:
   a parallel to serial converter for combining the plurality of parallel sub-streams of received symbols into the sequential stream of received data symbols; and,
   a decoder for de-coding the sequential stream of data symbols.

* * * * *